(12) United States Patent
Amirabadi et al.

(10) Patent No.: US 12,719,383 B2
(45) Date of Patent: Aug. 25, 2026

(54) ZETA-BASED AC LINK UNIVERSAL POWER CONVERTER

(71) Applicant: Northeastern University, Boston, MA (US)

(72) Inventors: Mahshid Amirabadi, Sudbury, MA (US); Mojtaba Salehi, Boston, MA (US); Masih Khodabandeh, Escondido, CA (US)

(73) Assignee: Northeastern University, Boston, MA (US)

( * ) Notice: Subject to any disclaimer, the term of this patent is extended or adjusted under 35 U.S.C. 154(b) by 236 days.

(21) Appl. No.: 18/223,513

(22) Filed: Jul. 18, 2023

(65) Prior Publication Data

US 2024/0022174 A1 Jan. 18, 2024

Related U.S. Application Data

(60) Provisional application No. 63/390,086, filed on Jul. 18, 2022.

(51) Int. Cl.
*H02M 7/219* (2006.01)
*H02M 1/00* (2007.01)
*H02M 3/00* (2006.01)

(52) U.S. Cl.
CPC ......... *H02M 7/219* (2013.01); *H02M 1/0058* (2021.05); *H02M 3/005* (2013.01)

(58) Field of Classification Search
CPC .... H02M 1/0058; H02M 3/158; H02M 3/005; H02M 5/458; H02M 7/217; H02M 7/219; H02M 1/0095
See application file for complete search history.

(56) References Cited

U.S. PATENT DOCUMENTS

| | | | | |
|---|---|---|---|---|
| 10,848,071 | B2 * | 11/2020 | Amirabadi | H02M 7/4826 |
| 2012/0307531 | A1 * | 12/2012 | Toliyat | H02M 5/4585 363/36 |
| 2016/0043633 | A1 * | 2/2016 | Phadke | H02M 1/10 363/21.08 |
| 2017/0250618 | A1 * | 8/2017 | Amirabadi | H02M 5/458 |
| 2017/0338732 | A1 * | 11/2017 | Amirabadi | H02M 3/155 |
| 2023/0170793 | A1 * | 6/2023 | Chen | H02M 3/1584 363/13 |

OTHER PUBLICATIONS

Masih Khodabandeh; Mahshid Amirabadi; A Soft-switching Single-stage Zeta-/SEPIC-based Inverter/Rectifier; Mar. 2020; IEEE, pp. 3456-3463 (Year: 2020).*

(Continued)

*Primary Examiner* — Gustavo A Rosario-Benitez
(74) *Attorney, Agent, or Firm* — Adams & Reese LLP

(57) ABSTRACT

A power conversion device includes an input stage from an unregulated power source to a switching circuit that is coupled to a thin film link capacitor. In some embodiments, the link stage permits soft switching. Further, a high frequency transformer may be utilized for management of voltage acquired from the circuit. Thus, a managed voltage may be supplied to an electrical load via a capacitor of reduced size and weight and with improved efficiency and reliability.

13 Claims, 46 Drawing Sheets

(56) References Cited

OTHER PUBLICATIONS

Kim et al., "New bilateral zero voltage switching AC/AC converter using high frequency partial-resonant link", 16th Annual Conference of IEEE Industrial Electronics Society, (1990), pp. 857-862.
Amirabadi et al., "Soft-Switching AC-Link Three-Phase AC-AC Buck-Boost Converter", IEEE Transactions on Industrial Electronics, vol. 62, No. 1, pp. 3-14, (2015).
Mozaffari et al., "A Highly Reliable and Efficient Class of Single-Stage High-Frequency AC-Link Converters", IEEE Transactions on Power Electronics, vol. 34, No. 9, pp. 8435-8452, Sep. 2019.
Amirabadi et al., "A Multiport AC Link PV Inverter With Reduced Size and Weight for Stand-Alone Application", IEEE Transactions on Industry Applications, vol. 49, No. 5, pp. 2217-2228 (2013).
Khan et al., "A new reliable three-phase buck-boost AC-AC converter," IEEE Trans. Ind. Electron., vol. 65, No. 2, pp. 1000-1010, Feb. 2018.
Gao et al., "Topological design and modulation strategy for buck-boost three-level inverters", IEEE Transactions on Power Electronics, vol. 24, No. 7, pp. 1722-1732, (2009).
Gao et al., "Diode-Assisted Buck-Boost Voltage-Source Inverters," IEEE Transactions on Power Electronics, vol. 24, No. 9, pp. 2057-2064, (2009).
Darwish et al., "Single-stage three-phase differential-mode buck-boost inverters with continuous input current for PV applications", IEEE Trans. Power Electron., vol. 31, No. 12, pp. 8218-8236, Dec. 2016.
Afshari et al., "A Single-Stage Capacitive AC-Link AC-AC Power Converter," IEEE Transactions on Power Electronics, vol. 34, No. 3, pp. 2104-2118, Mar. 2019.
Khodabandeh et al., "A Single-Stage Soft-Switching High-Frequency AC-Link PV Inverter: Design, Analysis, and Evaluation of Si-Based and SiC-Based Prototypes", IEEE Transactions on Power Electronics, vol. 34, No. 3, pp. 2312-2326, (2018).
Khodabandeh et al., A Soft-switching Single-stage Zeta-/SEPIC-based Inverter/Rectifier, (2020) IEEE Applied Power Electronics Conference and Exposition (APEC), pp. 3456-3463.

* cited by examiner

Three-phase Source
IA-filtered
IB-filtered
IC-filtered
L-filter
C-filter
IA-unfiltered
IB-unfiltered
IC-unfiltered
A
B
C
Q1
Q2
Q3
Q4
Q5
Q6
I_in
+
V_in
L_in
I_link
V_link1
-
+
C1
L_resonance1
HFT
Optional
V_link2
-
+
C2
L_resonance2
I_out
I_out
Qdc
+
V_out
-
DC Load (a)

*FIG. 2E*

C_resonance

Iin

L_in

+ Vin -

Figure 7:
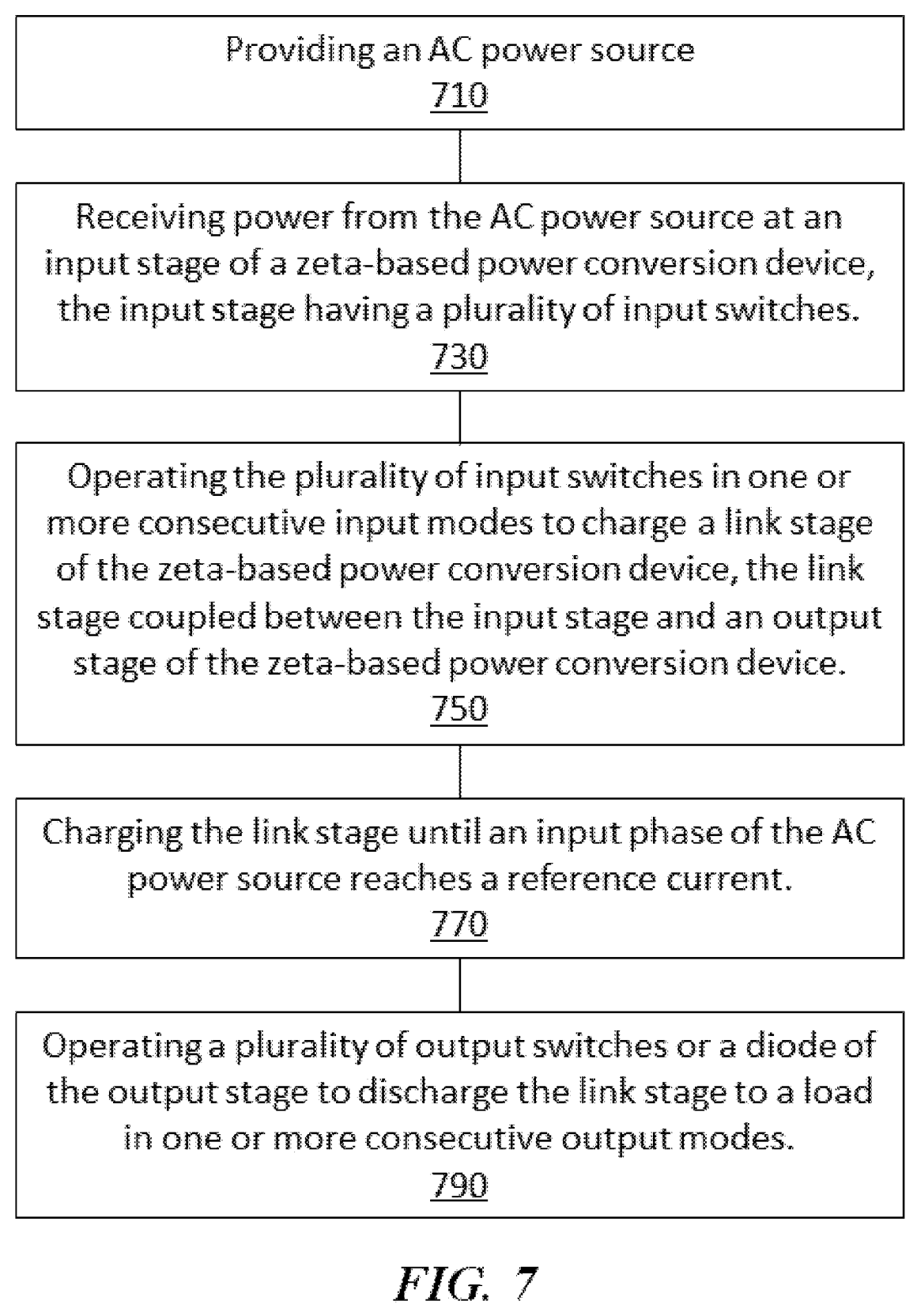

Providing an AC power source
710

Receiving power from the AC power source at an input stage of a zeta-based power conversion device, the input stage having a plurality of input switches.
730

Operating the plurality of input switches in one or more consecutive input modes to charge a link stage of the zeta-based power conversion device, the link stage coupled between the input stage and an output stage of the zeta-based power conversion device.
750

Charging the link stage until an input phase of the AC power source reaches a reference current.
770

Operating a plurality of output switches or a diode of the output stage to discharge the link stage to a load in one or more consecutive output modes.
790

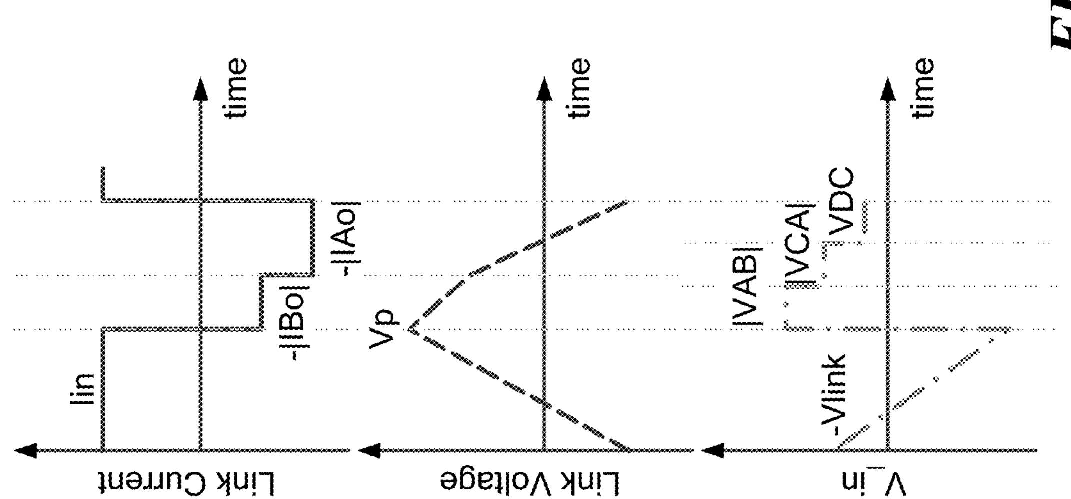
FIG. 8A Continued
From FIG. 8A
From FIG. 8A

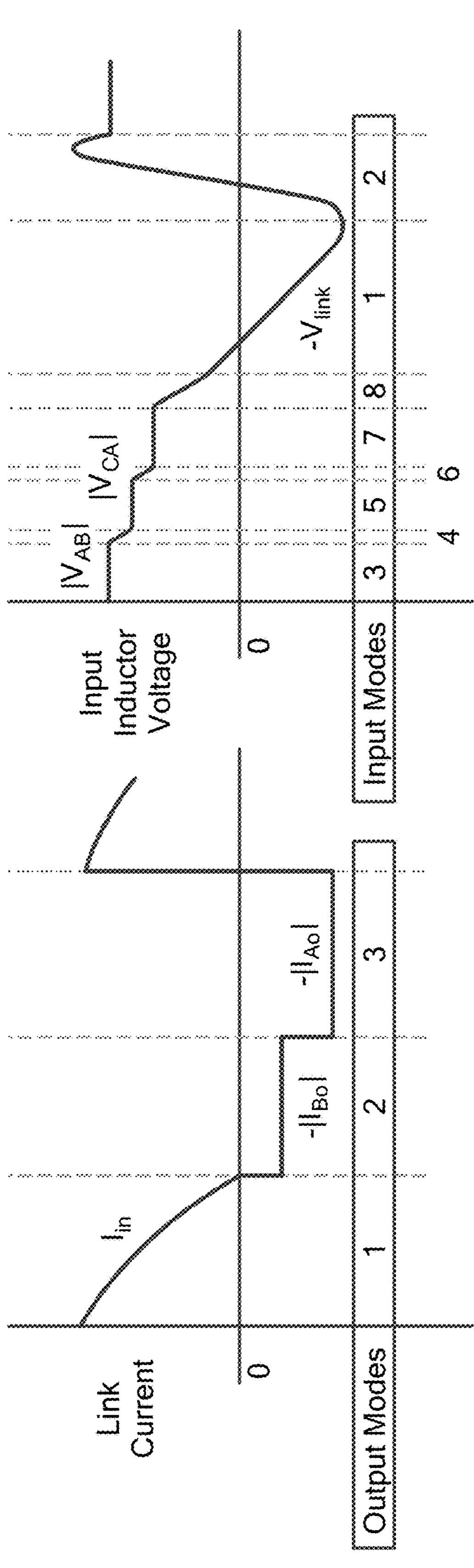
FIG. 8B Continued
From FIG. 8B
From FIG. 8B

ZETA-BASED AC LINK UNIVERSAL POWER CONVERTER

CROSS-REFERENCE TO RELATED APPLICATIONS

This application claims the priority of U.S. Provisional Application No. 63/390,086 filed 18 Jul. 2022 and entitled “Zeta-Based AC Link Universal Power Converter”, the whole of which is hereby incorporated by reference.

STATEMENT REGARDING FEDERALLY SPONSORED RESEARCH OR DEVELOPMENT

This invention was made with government support under Grant Number 2047213 awarded by the National Science Foundation, and DE-AR0000902 awarded by ARPA-E. The government has certain rights in the invention.

BACKGROUND

Power converters have become an increasingly critical component of many systems. For example, renewable energy systems, electric vehicles, electrical drives and a host of other emerging technological load types make use of power converters, each with a particular set of requirements for reliable operation. However, conventional DC-link power converters often lack the ability to support reliability-demanding applications. Such converters may be prone to frequent failures and a relatively short lifespan due to reliance on electrolytic capacitors.

Further, the increasing variety of these electrical load types in combination with the availability of a variety of different types of power sources has led to a heightened demand for more versatile or universal converters. Along these lines, AC link universal converters derived from DC-DC converters have received increasing attention. Buck-Boost-based and Ćuk-based universal converters are common types of these AC link converters.

Single-stage Buck-Boost-based universal converters use an inductor at the link to transfer power. Unfortunately, to minimize the size of the inductor, a high current ripple is generally tolerated. This may translate to a high link peak current, which increases the conduction losses of the switches. In other words, for sake of the convenience of having a more universal converter, a substantial amount of efficiency is lost. Efforts to minimize these losses have been undertaken. For example, utilizing a small capacitor in parallel with the link inductor may help to improve efficiency. In a soft-switching Buck-Boost-based universal converter a reduced link peak current is presented to enhance the efficiency of the system. However, this may also lead to a substantial resonating interval during which no power is transferred which may adversely affect performance of the system. Overcoming this to a degree with four-quadrant switches in place of two-quadrant switches only serves to double the number of switches.

Other efforts such as the use of a Buck-Boost-based converter configurations often suffer from high current spikes and relatively low efficiency nonetheless. In Buck-Boost-based AC-link converters in particular, achieving high efficiency is generally challenging.

Ćuk-based universal converters have been developed in which a small series film capacitor is employed as the energy transferring element. A Ćuk-derived three-phase AC-AC may use a small series film capacitor in place of a larger electrolytic one. Soft switching is achieved by adding a small inductor in series with the capacitor. Unfortunately, this type of link capacitor has a high peak voltage for Cuk-based universal converters.

SUMMARY

Embodiments of a power conversion device are described. The device or converter includes an input stage coupled to a power source with a switching circuit of a network coupled to the input source for management of power from the source. A link stage of the network with higher frequency than the frequency of the input power source is coupled to the circuit. At the same time, a transformer of the network is coupled to the capacitor and has a frequency same as the switching frequency of the switches for management of voltage therefrom. An output stage of the switching circuit may then be utilized for distribution of voltage to an electrical load.

Other aspects of these embodiments may include a novel Zeta-based universal converter that configured as a rectifier, an AC-AC converter, an inverter, or a multiport converter. The topology used eliminates the use of bulky electrolytic capacitors while also increasing power density by using lightweight high-frequency transformers instead of heavy line-frequency transformers. In contrast to Cuk-based and Buck-Boost-based universal converters, the Zeta-based universal converter embodiments detailed herein may have lower capacitor peak voltage.

Other advantages may include improved power density, lifetime, and reduced cost. Renewable energy systems, electric vehicles and industrial drives may utilize embodiments of converters detailed herein. Similarly, embodiments of converters described below may effectively be utilized for power conversion from any type of power source including, DC or AC, to any type of load. Usage of these converters results in enhancing the reliability by employing small film capacitors instead of bulky unreliable electrolytic ones. Furthermore, such converters offer a high-power density advantage due to the possibility of using compact high-frequency transformers when isolation is needed. Embodiments of a novel zeta-based “universal” converter (both hard-switching and soft-switching configurations) are detailed herein. Such converters may be capable of stepping up and stepping down the voltage over a wide range. In comparison to Cuk-based and buck-boost-based converters, this topology uses a capacitor with a lower voltage rating.

Other advantages and/or unique aspects of the embodiments detailed herein may include, but are neither required nor limited to the following. A converter universality that may be used with DC or AC, single-phase or multi-phase sources or loads. As such, embodiments detailed herein may be configured as an inverter, rectifier, or AC-AC converter. Embodiments hereof may also be configured as multi-port converters, utilize soft-switching, avoid the use of large capacitors, and provide isolation through a single-phase high frequency transformer. Embodiments may also utilize small film capacitors configured for use with high power systems which have a voltage rating lower than Cuk-based universal converters. Converter embodiments may present a smaller number of possible failures and therefore lower repair and replacement cost. Cost and other advantages may also be realized through a more compact form factor with lowered shipping and installation challenges. Embodiments may also offer both step up and step down voltage management. Embodiments of the detailed technology may be employed with electric vehicles, solar energy systems, wind energy systems, microgrids and a host of other power source and/or load types.

The following U.S. Patents are hereby incorporated by reference in their entireties: U.S. Pat. Nos. 10,848,071; 10,250,120; 9,543,853; 8,988,900; and 7,599,196.

Further, embodiments hereof may include features such as the following:

1. A power conversion device comprising:
   - an input circuitry comprising a plurality of bidirectional-blocking forward-conducting switches or a forward-blocking bidirectional-conducting switch that are controllable in at least one direction, coupled to a power source for management of power obtained therefrom;
   - an output stage comprising a plurality of forward-blocking bidirectional-conducting switches or a diode, coupled to a load for the control of voltage to an electrical load;
   - wherein the device is operative in a continuous conduction mode or discontinuous conduction mode or in a boundary of continuous conduction mode and discontinuous conduction mode;
   - wherein each of the bidirectional-blocking forward-conducting switches comprises a single controllable switching device and a series diode, and the forward-blocking bidirectional conducting switch comprises a single controllable switching device and an anti-parallel diode;
   - wherein the device is operative to charge the link stage from the power source in one or more consecutive input modes until, for each input mode except the last mode, a current of an input phase of the power source reaches a reference current, and is operative to discharge the link stage to the load in one or more consecutive output modes, for each output mode except the last mode, a voltage across an output phase pair reaches a reference voltage, and for the last mode, to discharge the link stage until a voltage across the link capacitor reaches the negative value of the minimum input voltage.
2. The device of feature 1, wherein at least two reactive components of the link stage comprise a capacitor and an inductor.
3. The device of feature 2, wherein the link stage has a frequency that is greater than the frequency of the power source.
4. The device of feature 3, wherein the link stage comprises at least three reactive components, wherein the link circuit is configured for alternating current (AC) operation.
5. The power conversion device of feature 1, wherein a high-frequency galvanic isolation device is coupled to the link stage to manage voltage therefrom, wherein the link capacitor comprises a first capacitor connected in series to a first terminal of the galvanic isolation device and a second capacitor connected in series to a second terminal of the galvanic isolation device.
6. The power conversion device of feature 1 wherein the device is one of a rectifier, an AC-AC converter, an inverter, or a multiport converter.
7. The power conversion device of feature 1 wherein the bidirectional-blocking forward-conducting switches are insulated-gate bipolar transistors with series diodes.
8. The power conversion device of feature 1 wherein the bidirectional-blocking forward-conducting switches are metal-oxide-semiconductor field-effect transistors with series diodes.
9. The power conversion device of feature 1 wherein the forward-blocking bidirectional-conducting switches are insulated-gate bipolar transistors with anti-parallel diodes.
10. The power conversion device of feature 1 wherein the forward-blocking bidirectional-conducting switches are metal-oxide-semiconductor field-effect transistors with anti-parallel diodes.
11. The power conversion device of feature 3, comprising an inductor in parallel with the input switch bridge or output switch bridge.
12. The power conversion device of feature 11, comprises a capacitor in series with the output switch bridge or input switch bridge.
13. The power conversion device of feature 11, comprising a small capacitor in parallel with the inductor to provide soft-switching.
14. The power conversion device of feature 12, comprising a small inductor in series with the capacitor to provide soft-switching.
15. The power conversion device of feature 1 wherein the link capacitor is a film capacitor or a ceramic capacitor.
16. The power conversion device of feature 15 wherein an energy storage capacity of the capacitor is significantly small.
17. The power conversion device of feature 5 wherein the transformer is a single-phase transformer and its frequency is the same as the switching frequency of the switches.
18. The power conversion device of feature 1 wherein the device is a zeta-based converter.
19. The power conversion system of feature 1 wherein the load includes one of battery, motor, a grid, or a plurality of different types of power loads.
20. The power conversion system of feature 1 wherein the load is a direct current (DC) power source.
21. The power conversion system of feature 1 wherein the load is an AC power source having a predetermined number of phases.
22. The device of feature 21, wherein the predetermined number of phases is three phases.
23. The power conversion system of feature 1 wherein the power source is one of a renewable energy source, grid, a battery, or a plurality of different types of power sources.
24. The power conversion system of feature 1 wherein the power source is a DC power source.
25. The power conversion system of feature 1 wherein the power source is an AC power source having a predetermined number of phases.
26. The device of feature 25, wherein the predetermined number of phases is three phases.
27. The power conversion system of feature 23 wherein the renewable energy source is one of wind energy and solar energy.
28. The power conversion system of feature 1 wherein one of the power source and the electrical load are of a type selected from a group consisting of AC, DC, single-phase and multi-phase.
29. A method of controlling for power management from a power source through a zeta-based converter for use by electrical load equipment, the method comprising:

routing power from the source to an input stage at a switching circuit;

alternatingly employing switches of the circuit to direct current to a link stage;

routing power from the link stage to an output stage at a switching circuit; and operating the power conversion device to regulate the input and output currents.

30. The method of feature 29 wherein the alternatingly employing of the switches to manage the power as a rectifier.

31. The method of feature 29 wherein the alternatingly employing of the switches to manage the power as an inverter.

32. The method of feature 29 wherein the alternatingly employing of the switches to manage the power as an AC-AC converter.

33. The method of feature 29 wherein the alternatingly employing of the switches to manage the power as a multi-port converter.

34. The method of feature 29 wherein the alternatingly employing of the switches comprises single-phase, three-phases, or multi-phases of alternating of the switches between off and on conditions.

35. The device of feature 1, further comprising one or more processors and memory, and machine-readable instructions stored in the memory that, upon execution by the one or more processors cause, and/or circuitry that causes the device to carry out operations to control sequence and duration of each of the switching devices.

BRIEF DESCRIPTION OF THE DRAWINGS

FIG. 6C illustrates exemplary link inductor voltage and current wave forms.

FIG. 7 is a flow-chart summarizing an embodiment of employing a Zeta converter to obtain and manage power from an unregulated power source for delivery to an electrical load in a managed manner.

DETAILED DESCRIPTION

Embodiments are described with reference to particular embodiments of Zeta-based converters and power management layouts therefor along with various types of power supplies and output load types. However, other layouts, power sources and load types beyond these referenced herein may take advantage of the embodiments detailed herein. Indeed, so long as the converter employs a link capacitor with a reduced peak voltage rating optionally employed in conjunction with a high frequency transformer, appreciable benefit may be realized. Additionally, it is of note that terms such as "universal" are utilized herein to indicate converter embodiments for which different types of power sources and/or loads may utilized. Such is not meant to infer that every conceivable type of source or load may be served by all such capacitors. Rather, such terms, where utilized may be used to emphasize a flexibility of use for such capacitors. Additionally, terms such as "converter" or "power conversion device" may be utilized interchangeably and are not meant to infer any particular limiting construction beyond normal and/or customary meaning.

Figure 1A:
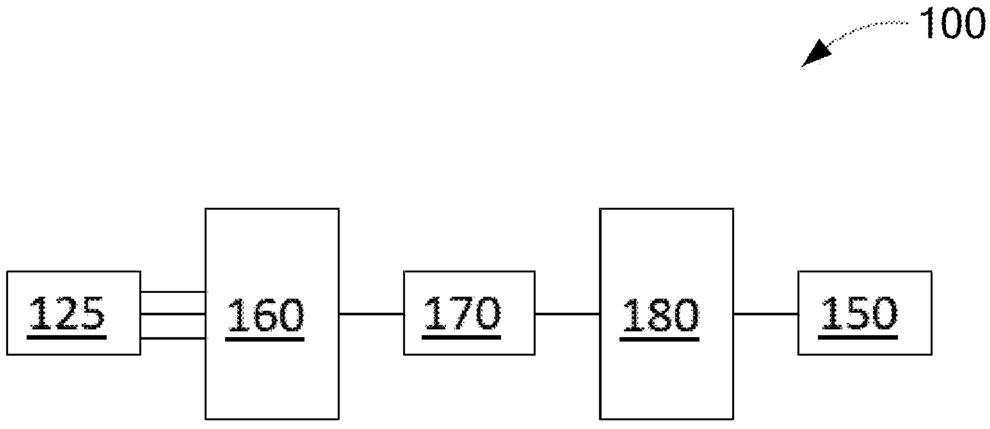
FIG. 1A is a block diagram of an embodiment of a Zeta based converter assembly employing a thin film link capacitor.

Referring now to FIG. 1A, a block diagram of a zeta-based converter assembly 100 is illustrated. The assembly 100 includes an input stage 160 for receiving power from a supply 125 which may supply power of various types. For example, as noted in FIG. 1B, a three-phase source 125 may be utilized and the input stage 160 may include a switching circuit. Regardless, the input stage 160 is coupled to a link stage 170, which is further coupled to an output stage 180 and, ultimately, an output load 150.

Figure 1B:
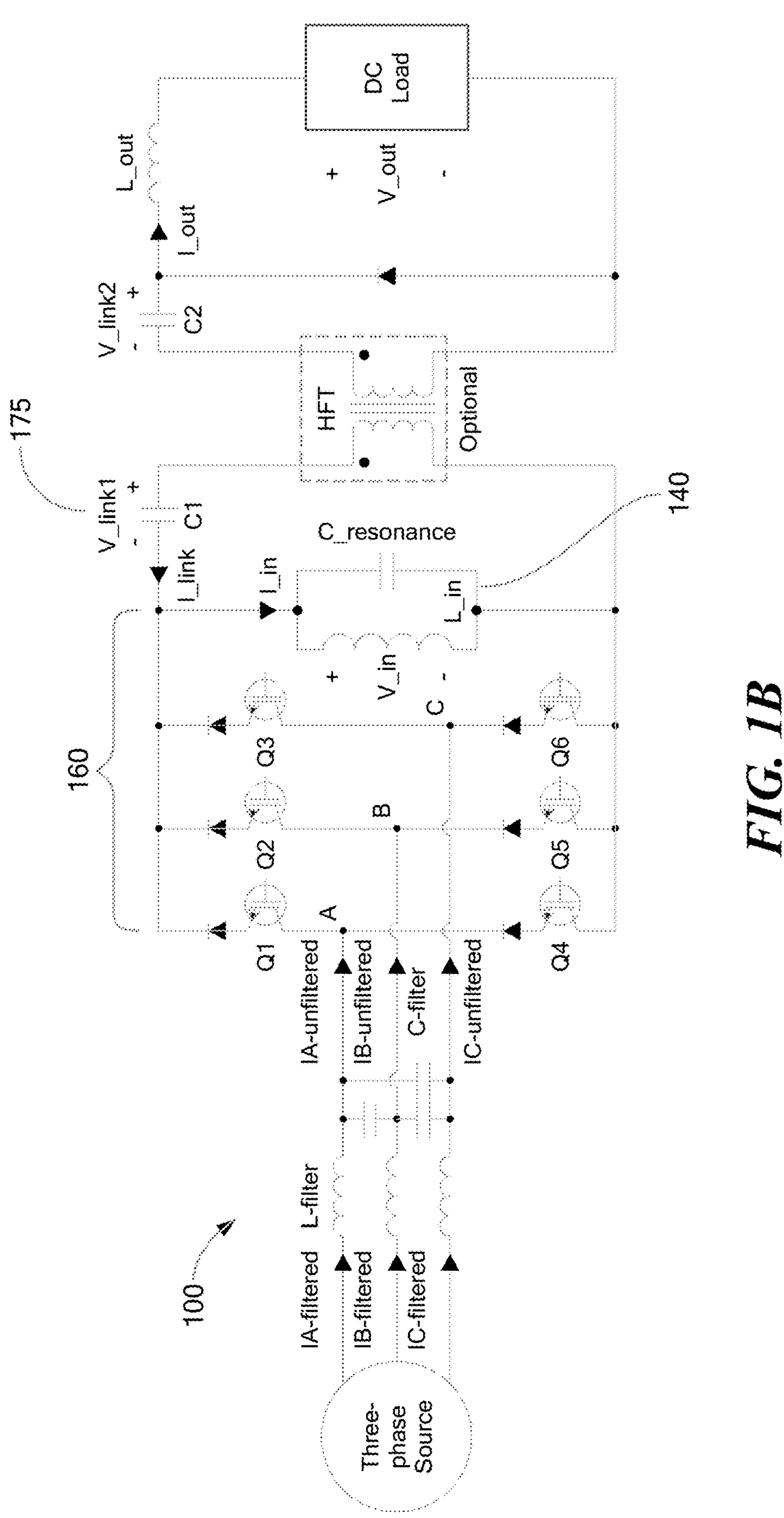
FIG. 1B is a schematic diagram of an embodiment of the Zeta-based converter assembly of FIG. 1A for utilization as a soft switching three phase rectifier.

The link stage 170, in some embodiments, can include an inductor 140 and one or more capacitors 175 as shown in FIG. 1B. Notice that, in the embodiment shown in FIG. 1B, current may flow between the input stage 160 and the inductor 140 so as to support stepping and management of the current as described below.

Continuing with reference to FIG. 1B, the inductor 140 can be coupled to the capacitor 175, which may be thin film or ceramic in nature and of a limited current rating as described herein. In the embodiment shown in FIG. 1B, the capacitor 175 may be linked to an optional transformer and to the inductor 140 for electrical communication therebetween and in both directions. The same is true for delivery of managed power between the transformer and the output load 150 as described herein.

Referring still to FIG. 1*i*, a schematic diagram of an embodiment of a three-phase Zeta-based converter 100 is shown for utilization as a rectifier. As suggested, the converter or converter assembly 100 illustrated is a three-phase rectifier to manage and convert an alternating current to a direct current by way of with a Zeta layout employed. Specifically, a power source 125 is coupled to the input stage 160 of the converter 100, which, in the embodiment of FIG. 1, makes use of a variety of switches (see Q1-Q6) that may be directed by a control board. Of particular note is the type of capacitor 175 that is utilized for routing power from an inductor 140 coupled to the circuit 160. This capacitor 175 may be a small thin film link capacitor, as detailed further below. In this way, utilization of electrolytic capacitor is avoided.

As shown, isolation may optionally be provided by way of a high frequency transformer. For example, in one embodiment, the transformer is for management of voltage from the capacitor 175, as detailed below. With added reference to FIG. 1C, exemplary link voltage, link current, and link input inductor voltage waveforms are depicted.

Figures 2A, 2B:
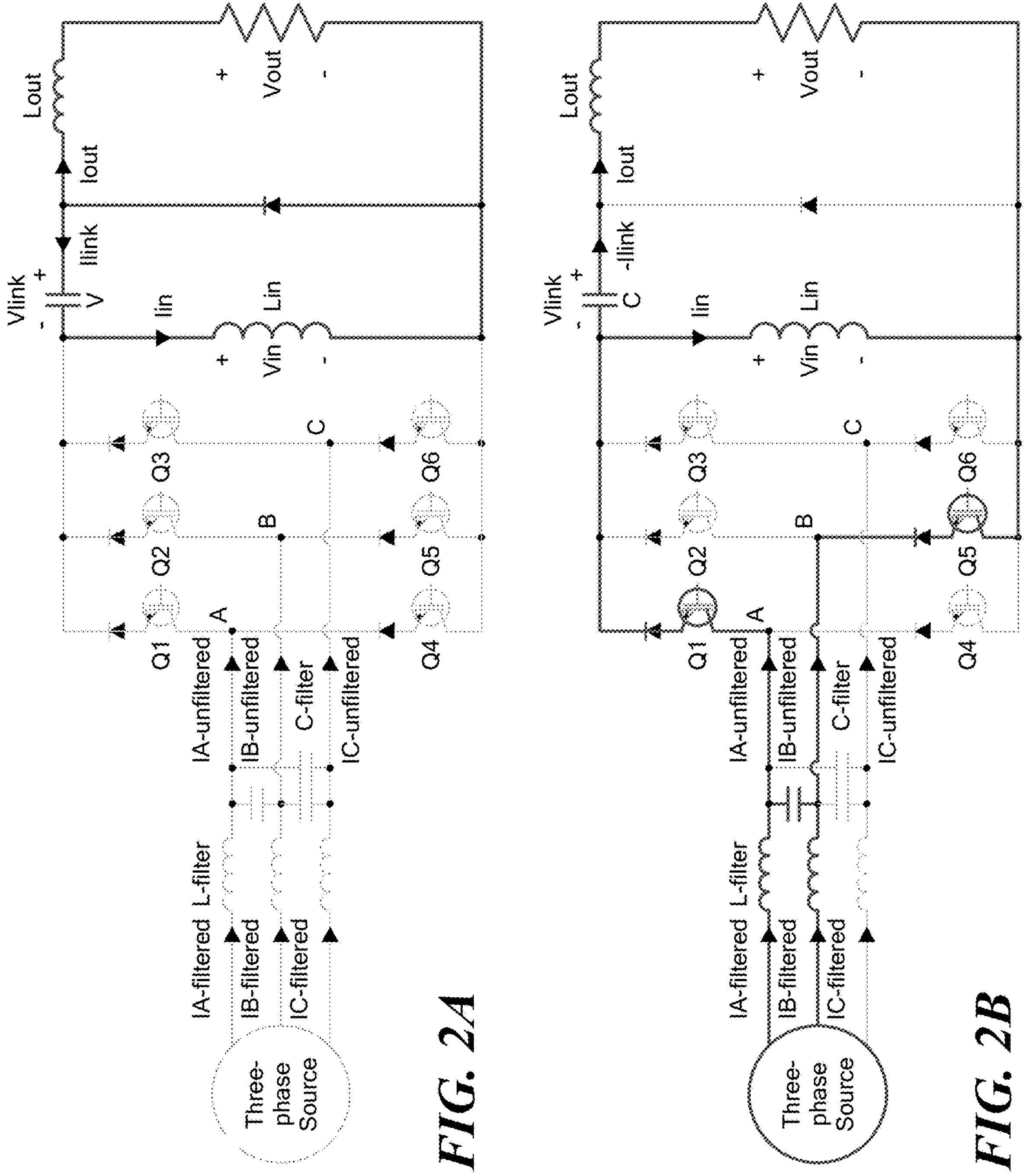
FIG. 2A is another schematic diagram of the converter of FIG. 1A illustrated during a first switching mode of a circuit.
FIG. 2B is a schematic diagram of the converter of FIG. 2A illustrated during a second switching mode of the circuit.
Figure 2C:
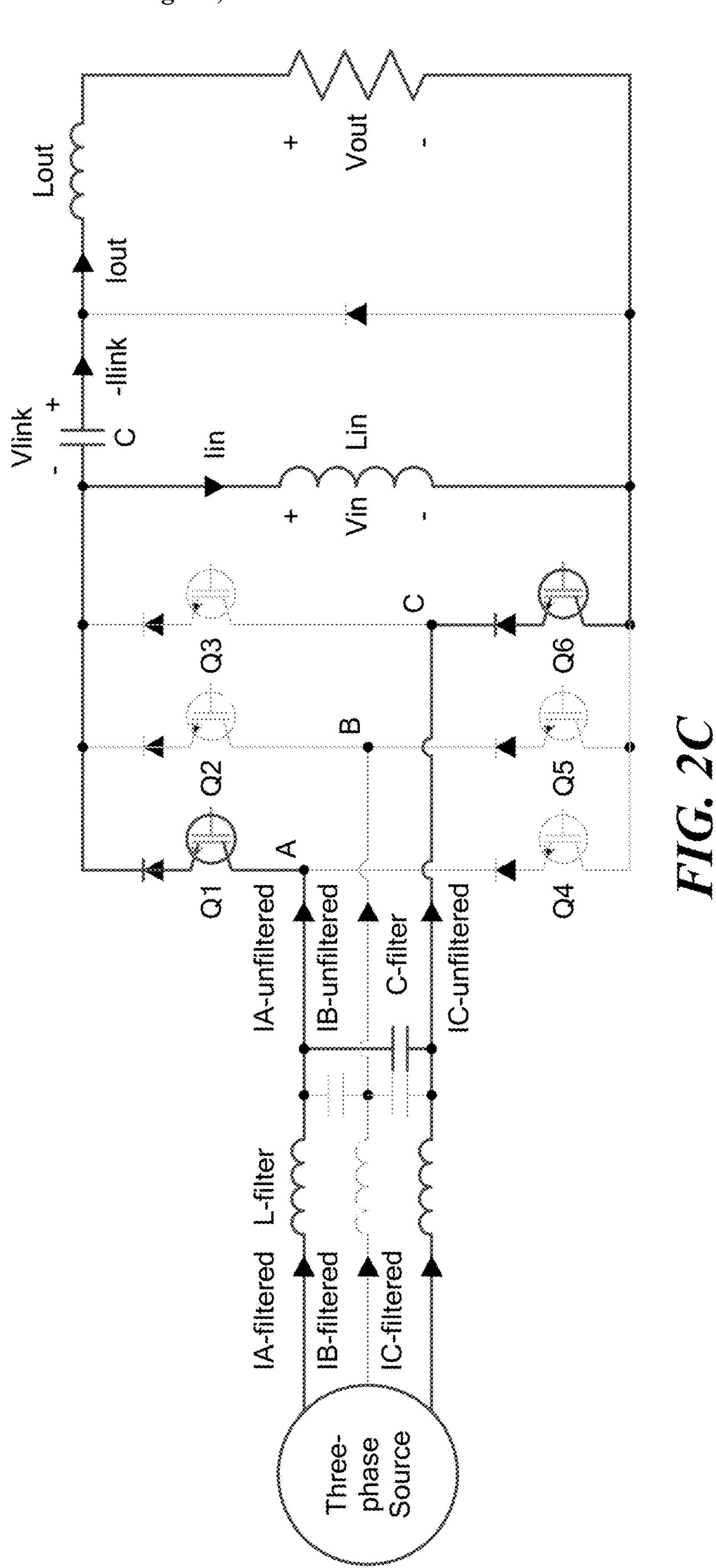
FIG. 2C is a schematic diagram of the converter of FIG. 2B illustrated during a third switching mode of the circuit.

With reference to FIGS. 2A-2C, operating modes of the converter 100 are illustrated. For the first mode illustrated in FIG. 2A, power is transferred from the link input inductor 140 ($L_{in}$) to the link capacitor 175. The second mode is a de-energizing mode from the link capacitor 175 to the DC load 150 of FIG. 1A according to the Zeta based layout illustrated. This second mode occurs in two different sub-modes illustrated in FIGS. 2B and 2C. During this second mode, the link capacitor 175 discharges to the output load 150 from the input AC source 125 (see FIG. 1A).

Continuing with reference to FIG. 2A, it is assumed that $$I_A^{ref},$$

the reference current of the depicted phase A is positive. The maximum absolute value among three-phase currents.

$$I_B^{ref}$$

and $$I_C^{ref}$$

are negative and the absolute value of $$I_C^{ref}$$

is smaller than $$I_B^{ref}.$$

This is reflective of the different zones and switching patterns employed. As shown in FIG. 2A, during the first mode, input switches (Q1-Q6) are off and the link capacitor 175 will be charged by the link input inductor 140 current ($I_{in}$) through the DC-side diode. The link voltage increases during this mode until a predetermined amount of power is transferred. It should be noted that during this mode all unfiltered input currents are equal to zero. Once the link 175 is charged sufficiently the proper input switches (e.g. Q1, Q5) are turned on as illustrated in FIG. 2B and the second mode may proceed.

Referring now to FIG. 2B, with added reference to FIG. 1A, the link capacitor 175 is discharged to the DC load 150 with current $I_{out}$, and the link capacitor voltage decreasing. Simultaneously, as noted above, in the first sub-mode, switches Q1 and Q5 are turned on such that the highest line-to-line voltage ($V_{AB}$) appears across the link input inductor 140 ($L_{in}$). During this mode, voltage $V_{AB}+V_{link}$ appears across the DC-side diode.

As soon as the average value of the second-highest current $$(I_B^{average})$$

meets its reference value $$(I_B^{ref}),$$

the switching status will change and the second sub-mode may proceed as illustrated in FIG. 2C. Specifically, current $I_C$ will flow to the link input Inductor 140 as switch Q6 is turned on. Switch Q1 remains on at this time and switch Q5 is turned off During this second sub-mode, the voltage over the link input inductor 140 ($L_{in}$) is equal to $V_{AC}$. This sub-mode continues until $$I_C^{average}$$

meets $$I_C^{ref}.$$

At this time, the unfiltered output voltage is equal to $V_{AC}+V_{link}$.

Figure 3A:
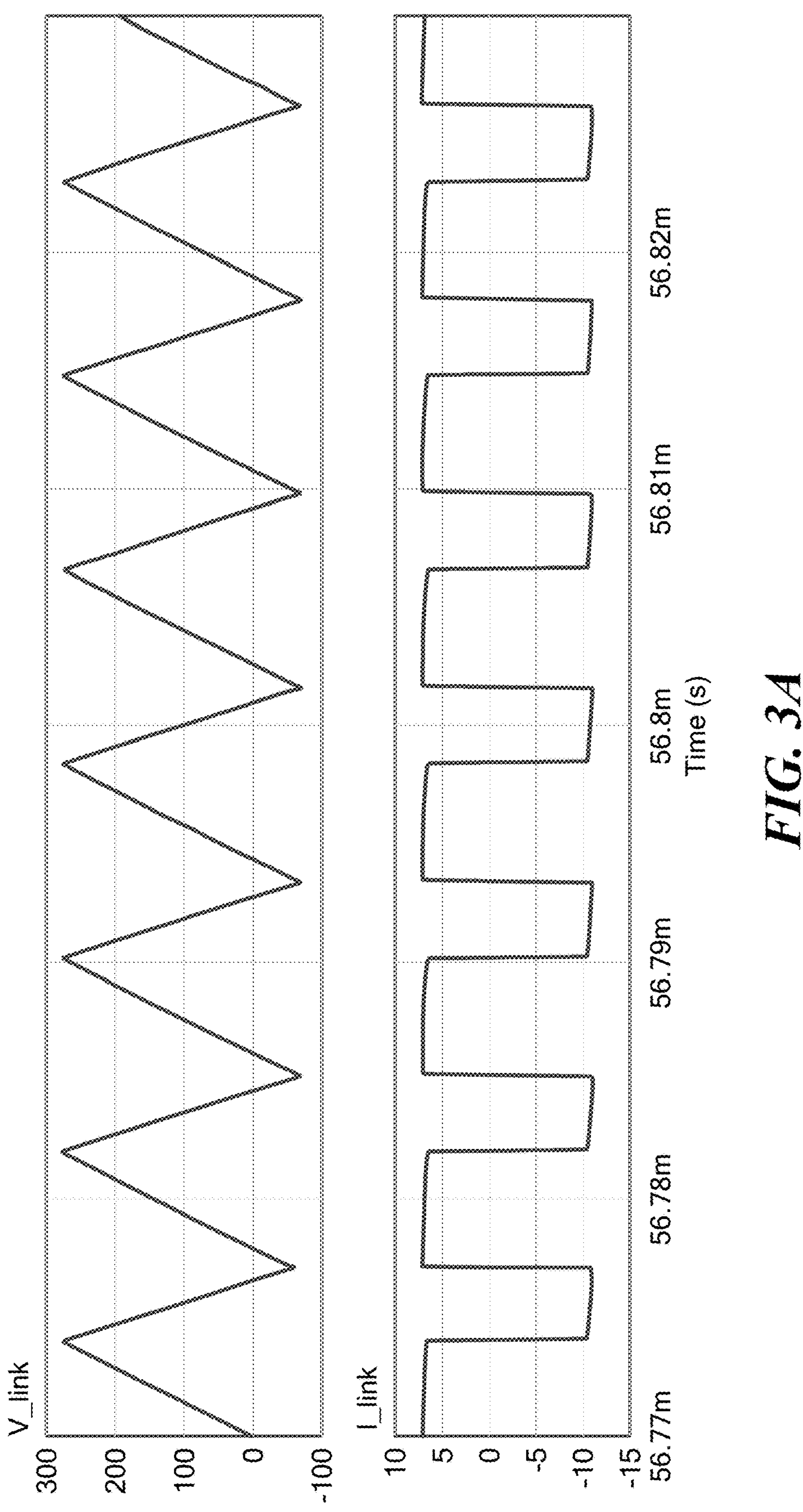
FIG. 3A is a chart illustrating link capacitor voltage and current waveforms for an embodiment of a Zeta rectifier as employed herein.
Figure 3B:
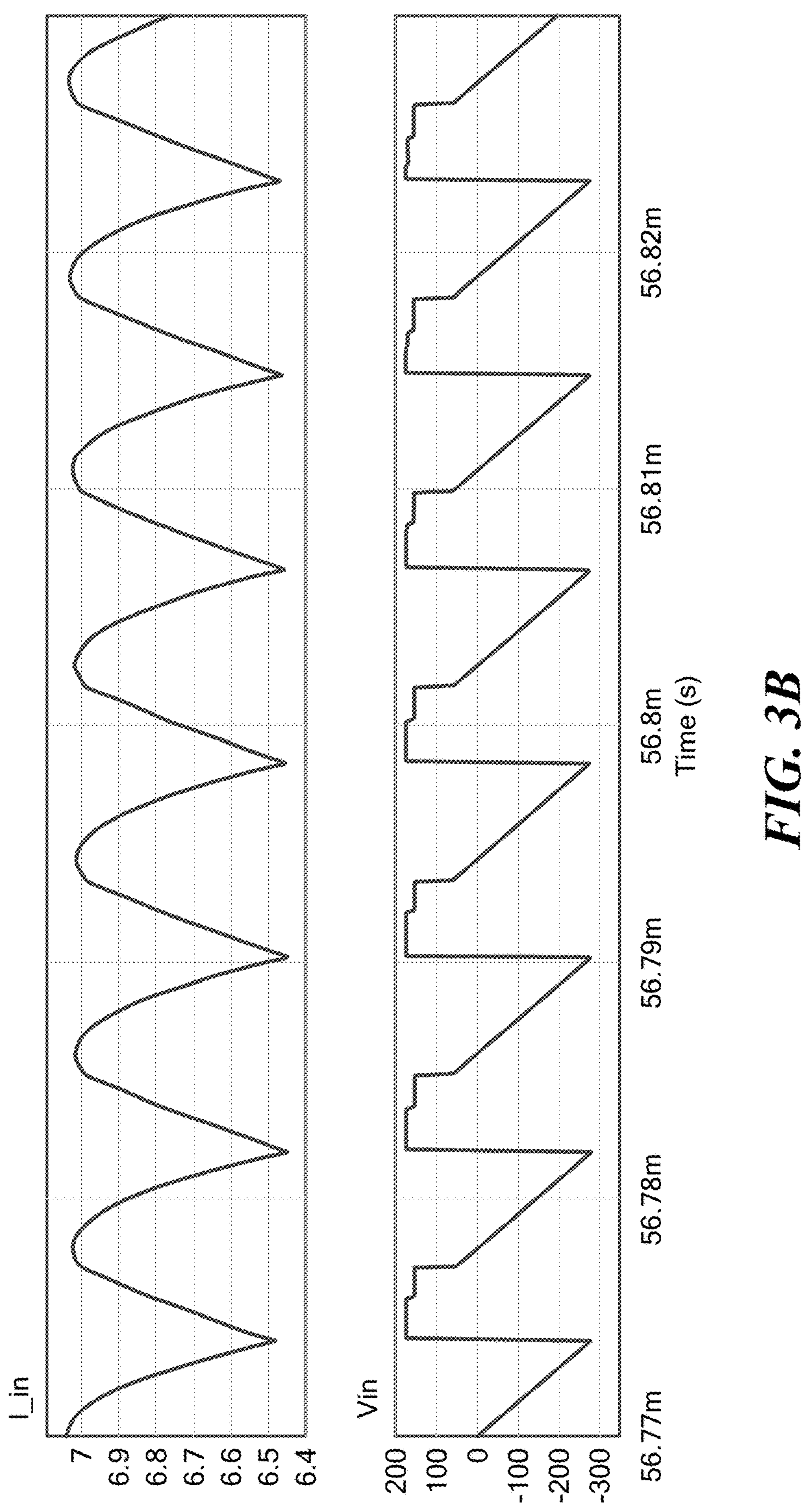
FIG. 3B is a chart illustrating link inductor voltage and current waveforms for an embodiment of a Zeta rectifier as employed herein.
Figure 3C:
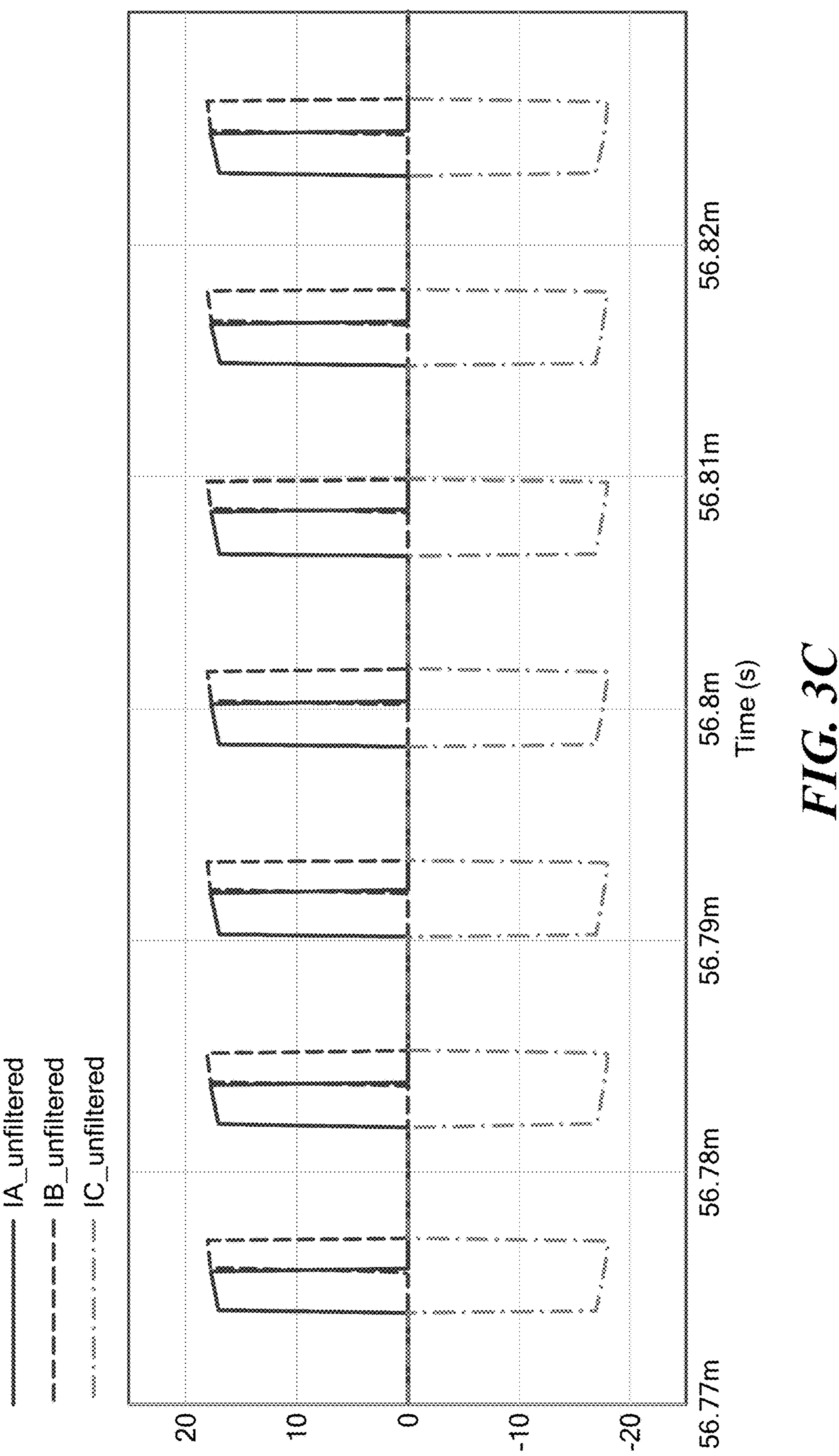
FIG. 3C is a chart illustrating unfiltered input current waveforms for an embodiment of a Zeta rectifier as employed herein.

Referring now to FIGS. 3A-3D, charts illustrating exemplary aspects of a Zeta rectifier as employed herein are shown. Specifically, FIG. 3A illustrates link capacitor voltage and current waveforms. FIG. 3B illustrates link inductor voltage and current waveforms and FIG. 3C illustrates unfiltered input current waveforms. Lastly, FIG. 3D illustrates filtered input currents and output DC voltage for embodiments of the Zeta rectifier as utilized herein.

Figure 1C:
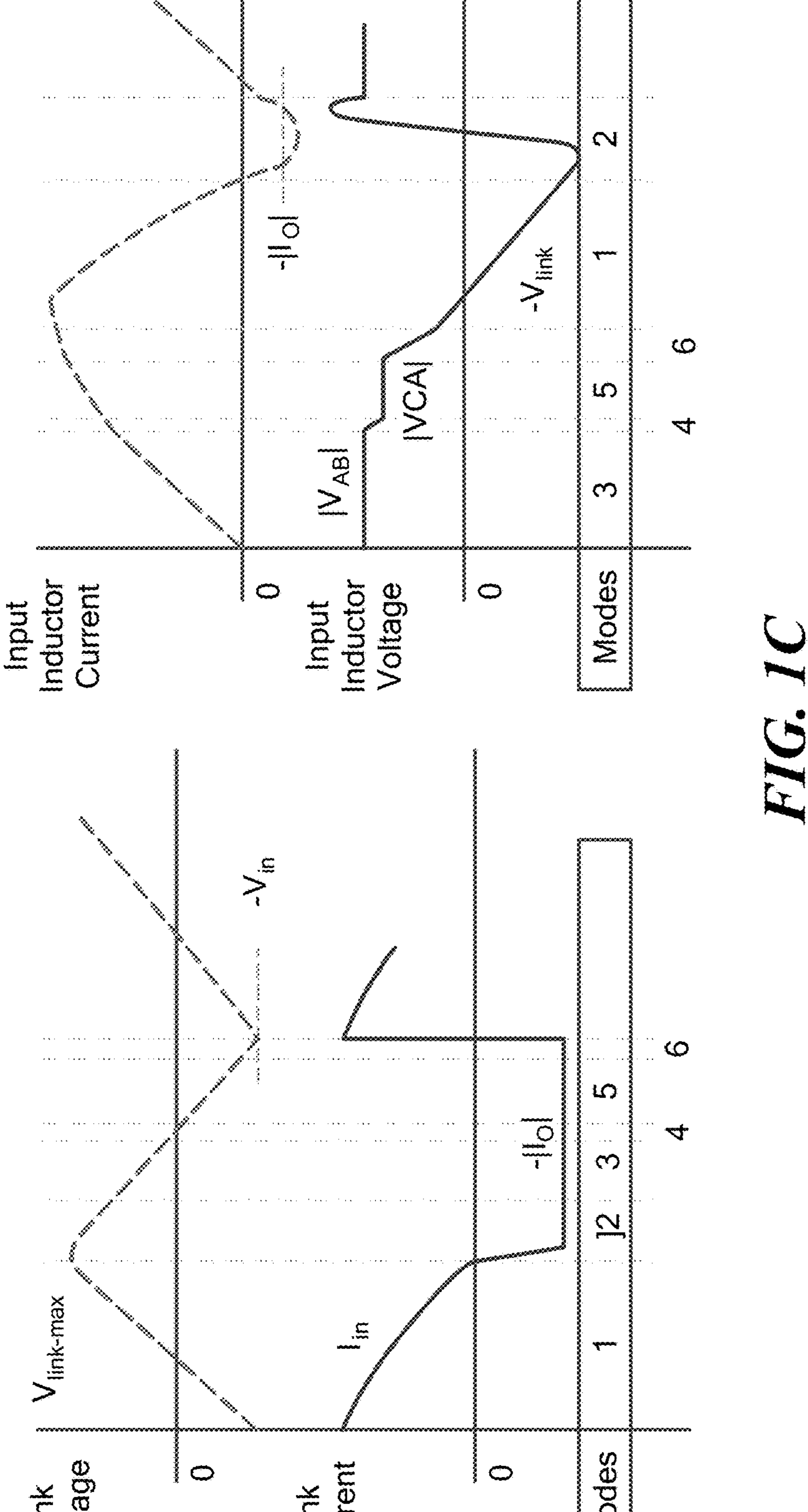
FIG. 1C is a chart indicating potential capacitor voltage, link capacitor current and input inductor voltage waveforms from an exemplary use of the converter of FIG. 1B.

Referring back now to FIG. 1B, the isolated soft-switching three-phase zeta rectifier is illustrated. In this topology, the input inductor ($L_{in}$), and link capacitors, C1 and C2, transfer the power from the input to the output. A small resonating capacitor ($C_{resonance}$) is connected in parallel with the inductor. The transformer is optional, and in the isolated converter, the isolation is provided with a high frequency transformer (HFT). In non-isolated topologies, only one capacitor is needed instead of C1 and C2. The link voltage, link current, input inductor voltage, and the input inductor current waveforms during different modes are depicted in FIG. 1C.

Each cycle has six main operating modes, including three power transfer modes and three resonating modes. In the first mode, power is transferred from the input inductor to the link capacitor through the DC-side diode (See FIG. 2D(a)). During this mode, input switches are off, and all unfiltered input currents are equal to zero. When the link capacitor is fully charged and the input inductor current becomes zero (FIG. 1C), the DC-side diode turns off under zero current switching (ZCS) condition and mode 2, which is a resonating mode, starts. During the first mode, the link capacitor voltage increases until its maximum value (FIG. 1C). During mode 2, all switches are off, and the input inductor resonates with its parallel capacitor (FIG. 2D(b)). At the end of this mode, the voltage of the input inductor reaches $V_{AB}$, and the voltages across switches Q1 and Q5 become zero to turn on these switches under zero voltage switching (ZVS) conditions.

Figure 2D:
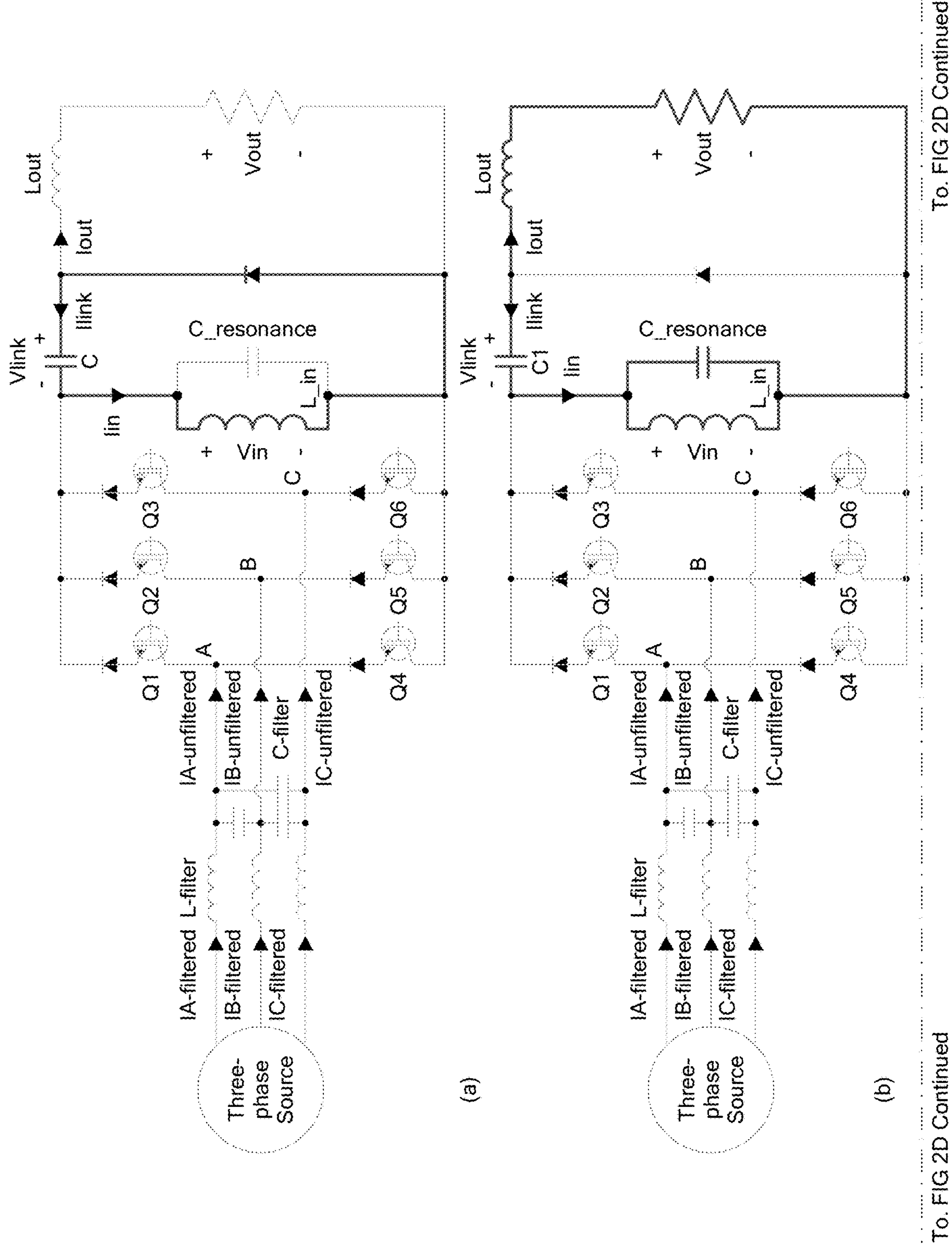
FIG. 2D is a series of schematic diagrams of a converter as the rectifier of FIG. 1B illustrating inductor detail and behavior during mode 1 (a), mode 2, 4 and 6 (b), mode 3 (c) and mode 5 (d).
Figure 2D:
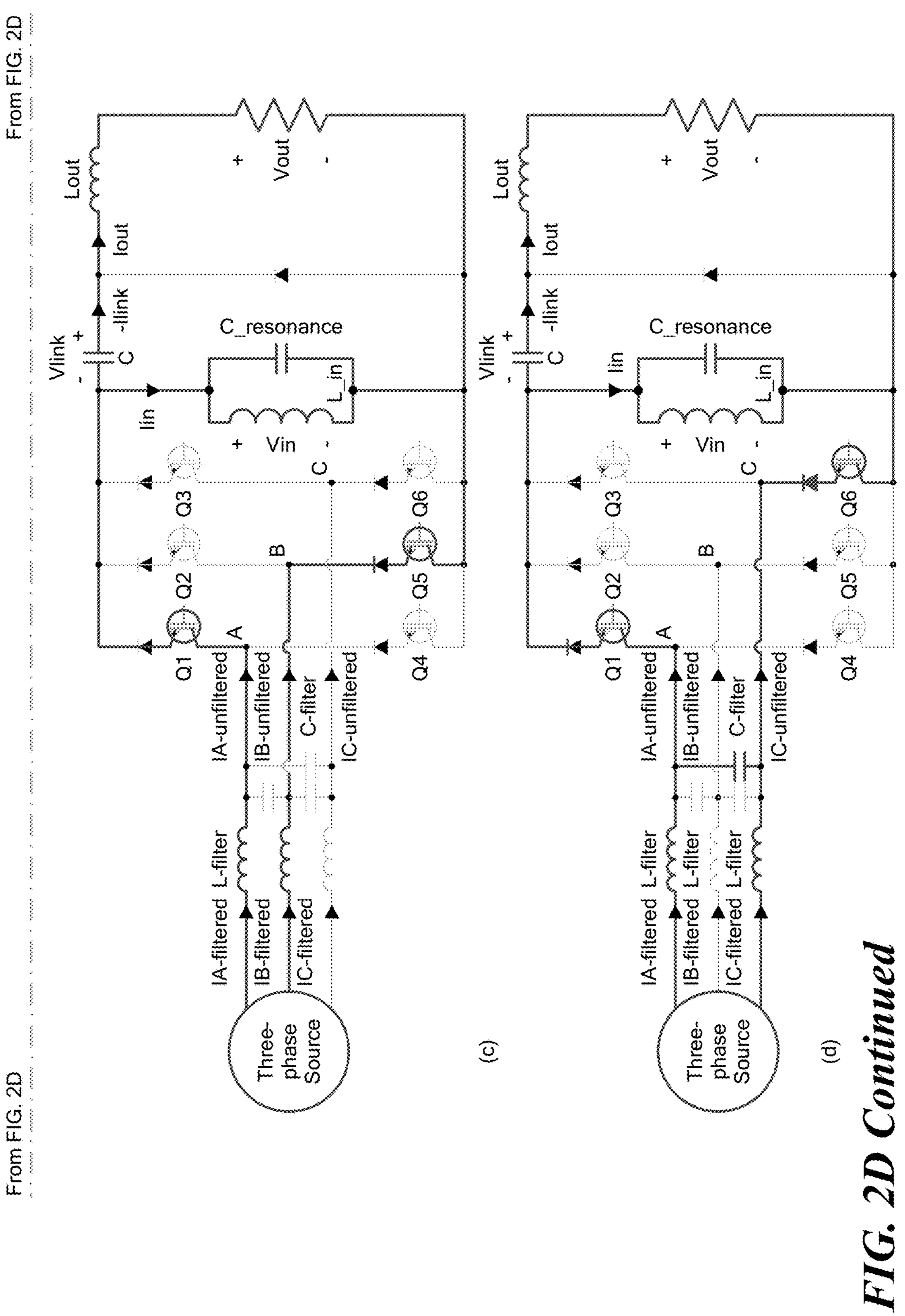

During modes 2 and 3 (FIGS. 2D(b) and 2D(c)), the link capacitor discharges to the DC load, and the link capacitor voltage decreases. Simultaneously, during mode 3, the input inductor charges from the input AC source with the second highest line current. When the current of phase B ($I_B$) meets its reference value $$(I_B^{ref}),$$

switch Q5 is turned off, and another resonating mode (mode 4) starts.

During mode 4 (FIG. 2D(b)), the voltage across the DC-side diode is reverse-biased, so it cannot conduct, and the input inductor resonates with its parallel capacitor until the voltage across them becomes equal to $V_{AC}$. At this moment, switch Q6 can turn on under ZVS, and mode 5 starts (FIG. 2D(d)).

In mode 5, the input inductor charges from the input AC phase that has the lowest line current, and the link capacitor simultaneously continues discharging to the load. When the current of phase A ($I_A$) meets its reference value $$(I_A^{ref}),$$

the last power-transferring mode finishes, and the last resonating mode starts.

In mode 6, all switches are turned off and the input inductor resonates with its parallel capacitor. When the voltage of the input inductor becomes equal to the absolute value of the link voltage, the DC-side diode turns on with ZVS and the next cycle starts. It should be noted that the resonating modes are much shorter than the power transferring modes, but they are shown longer in FIG. 1C for more clarification.

Figure 2E:
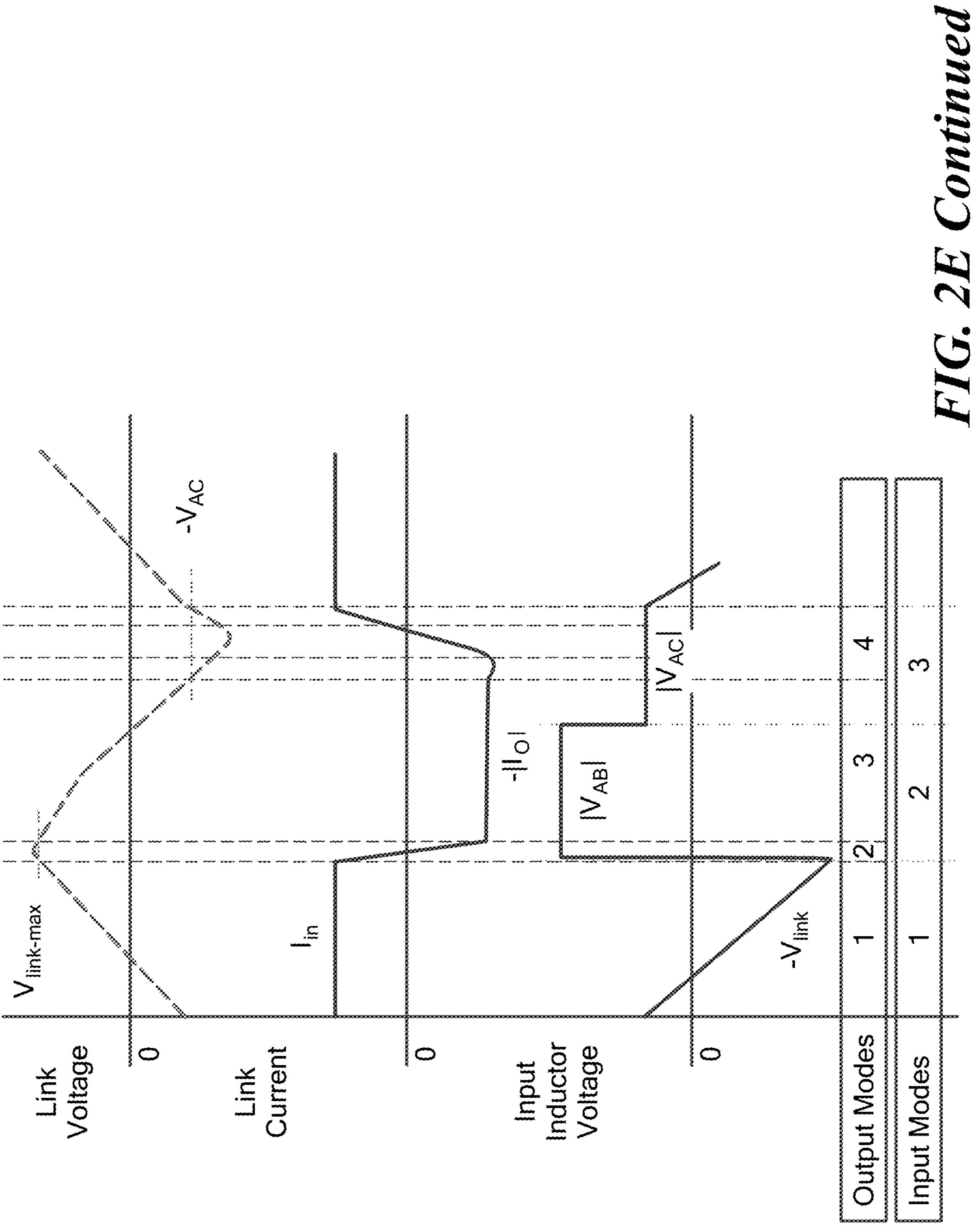
FIG. 2E is a schematic diagram (a) illustrating the converter as rectifier of FIG. 2D with zero current switchings and a chart (b) illustrating voltage and current waveforms of the link capacitor and input inductor with zero current switchings.
Figure 2F:
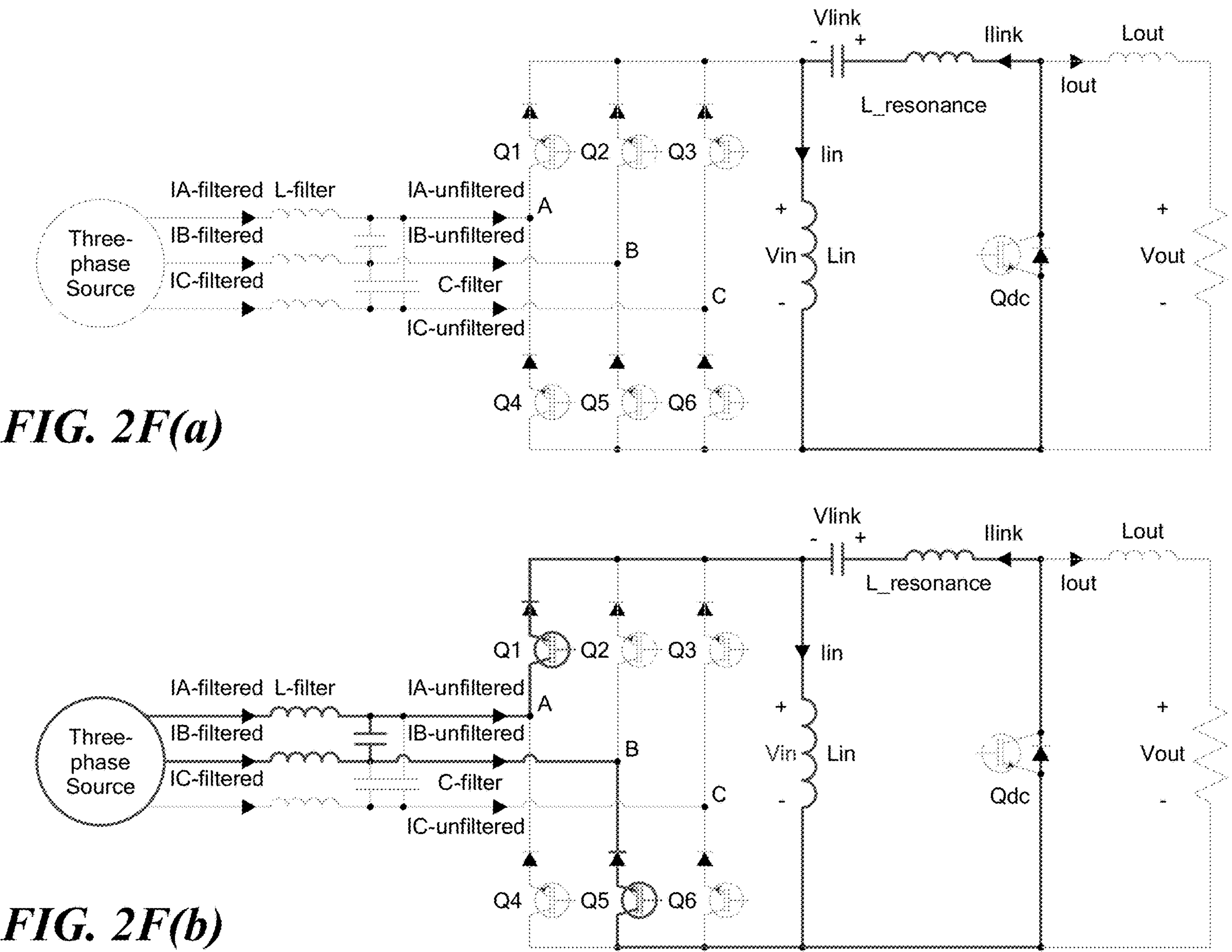
FIG. 2F is a series of schematic diagrams of the converter as rectifier employed in a non-isolates manner during mode 1 (a), mode 2 (b), mode 3 (c) (first charging mode), mode 3 (d) (second charging mode) and mode 4 (e).
Figure 2F:
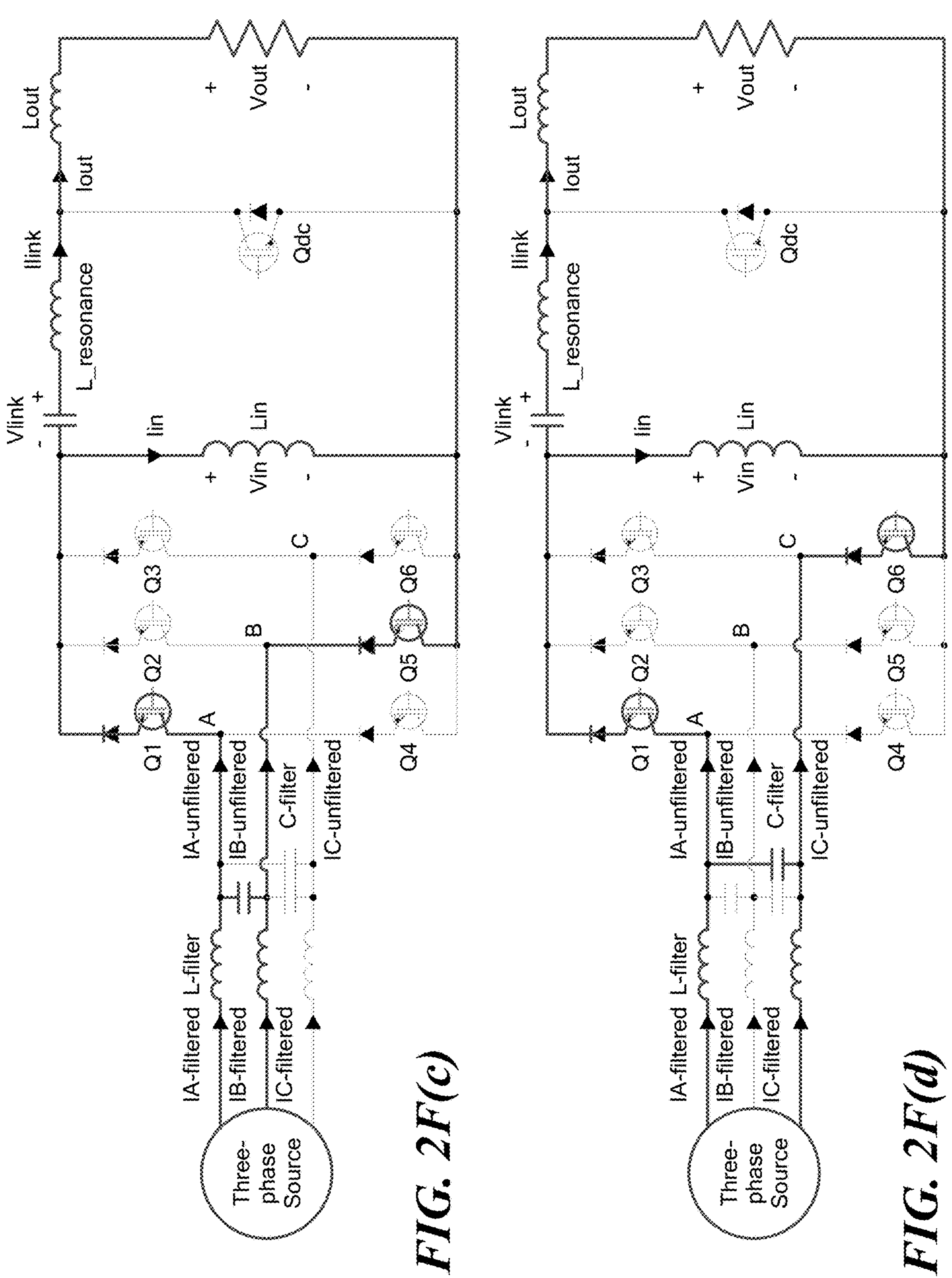
Figure 2F:
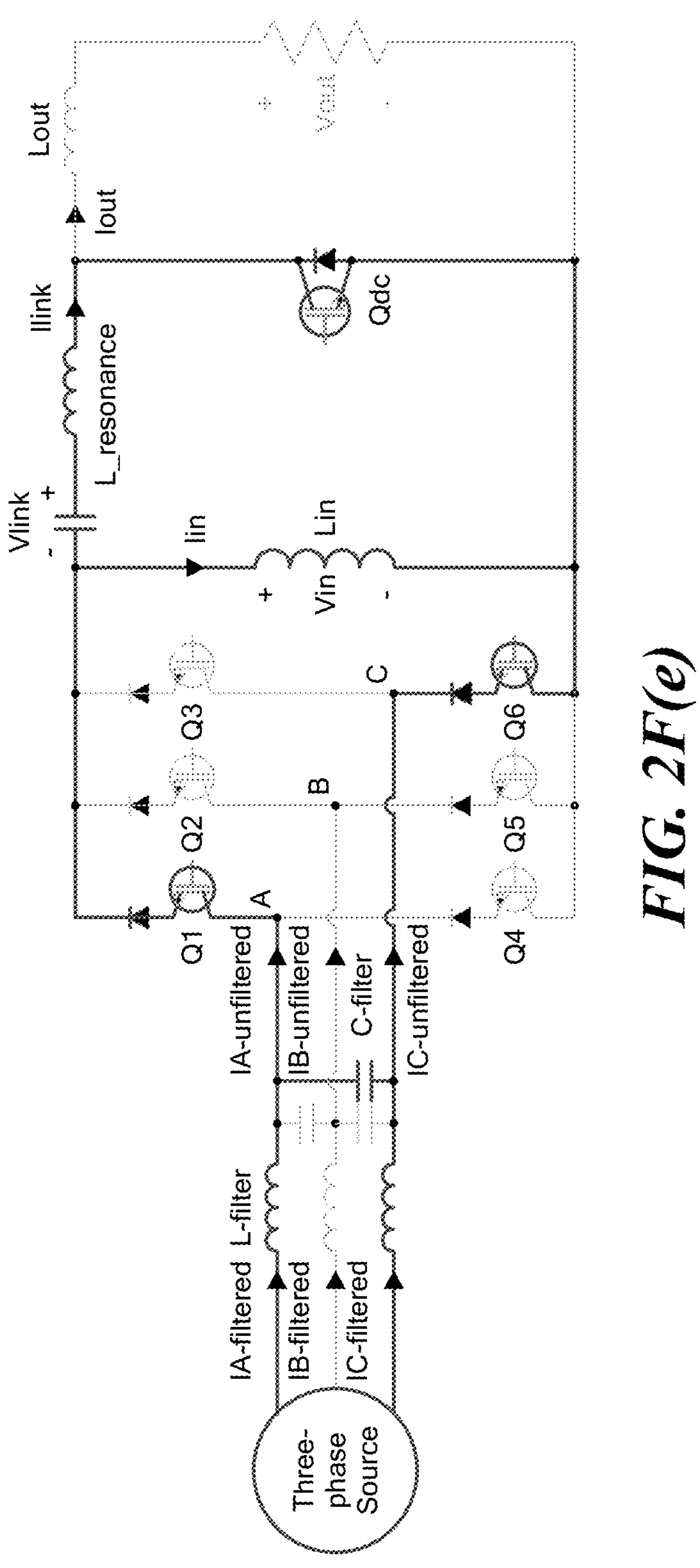

FIG. 2E(a) shows the isolated soft-switching Zeta rectifier. Additionally, a small resonating inductor ($L_{resonance}$) is connected in series with each link capacitor to provide the resonating modes. In non-isolated topologies, only one capacitor is necessary instead of $C_1$ and $C_2$. To clarify the system behavior, FIG. 2E(b) shows the link voltage, link current, and input inductor voltage waveforms during different modes. Throughout each cycle, the operation of the proposed converter contains four distinct operating modes for the output side and three operating modes for the input side. The initial mode, characterized by the absence of switch activation, allows the input inductor current ($I_{in}$) to charge the link capacitor via the DC-side antiparallel diode (FIG. 2F(a)). As the link capacitor voltage reaches its peak, the appropriate switches are triggered, marking the start of the second mode. This mode contains a resonating behavior for the link capacitor alongside a charging mode for the link input inductor. It should be noted that during this mode, the unfiltered input currents and the unfiltered output voltage remain at zero.

Mode 2 of the converter activates Q1 and Q5 to charge the input inductor with the highest line-to-line voltage ($V_{AB}$). Simultaneously, the link capacitor and its series inductor enter a resonating state through the short circuit provided by the DC side diode until the link current reaches zero to turn it off under ZCS condition (FIG. 2F(b)). Once the link current becomes zero and the DC side diode turns off, the link current decreases gradually to a negative value ($-|I_o|$) to start the link capacitor discharging mode.

During the first input inductor charging mode, when $$I_B^{average}$$

meets $$I_B^{ref},$$

switch Q5 is turned off. It is important to note that the unfiltered output voltage during this mode is equal to $V_{AB}+V_{link}$. Subsequently, switch Q6 can be activated to charge the input inductor with $V_{AC}$ in the second charging mode (FIG. 2F(d)). The unfiltered output voltage would be equal to $V_{AC}+V_{link}$. As the link voltage reaches $-V_{AC}$, switch $Q_{dc}$ turns on to start the last resonating mode.

In this mode, the link current initially flows in the negative direction through $Q_{dc}$. Once the link current reaches zero, $Q_{dc}$ stops conduction under ZCS conditions, allowing its antiparallel diode to conduct the positive link current. This mode continues until the link current aligns with the input inductor current to turn off Q1 and Q6 under ZCS.

Figure 4A:
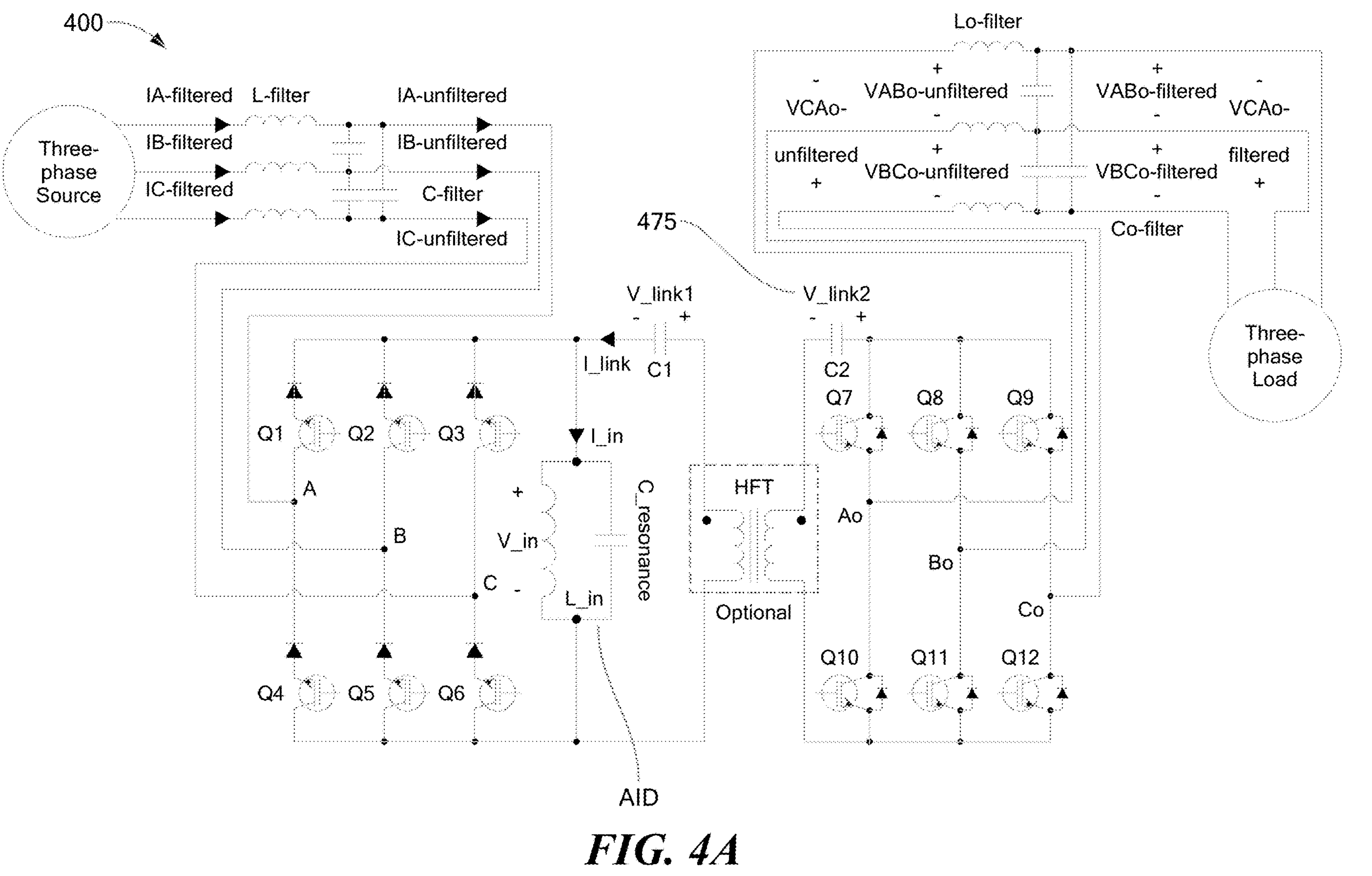
FIG. 4A is a schematic illustration of an isolated soft-switching Zeta converter for an embodiment employed as an AC-AC converter during different modes.
Figures 4B, 4C:
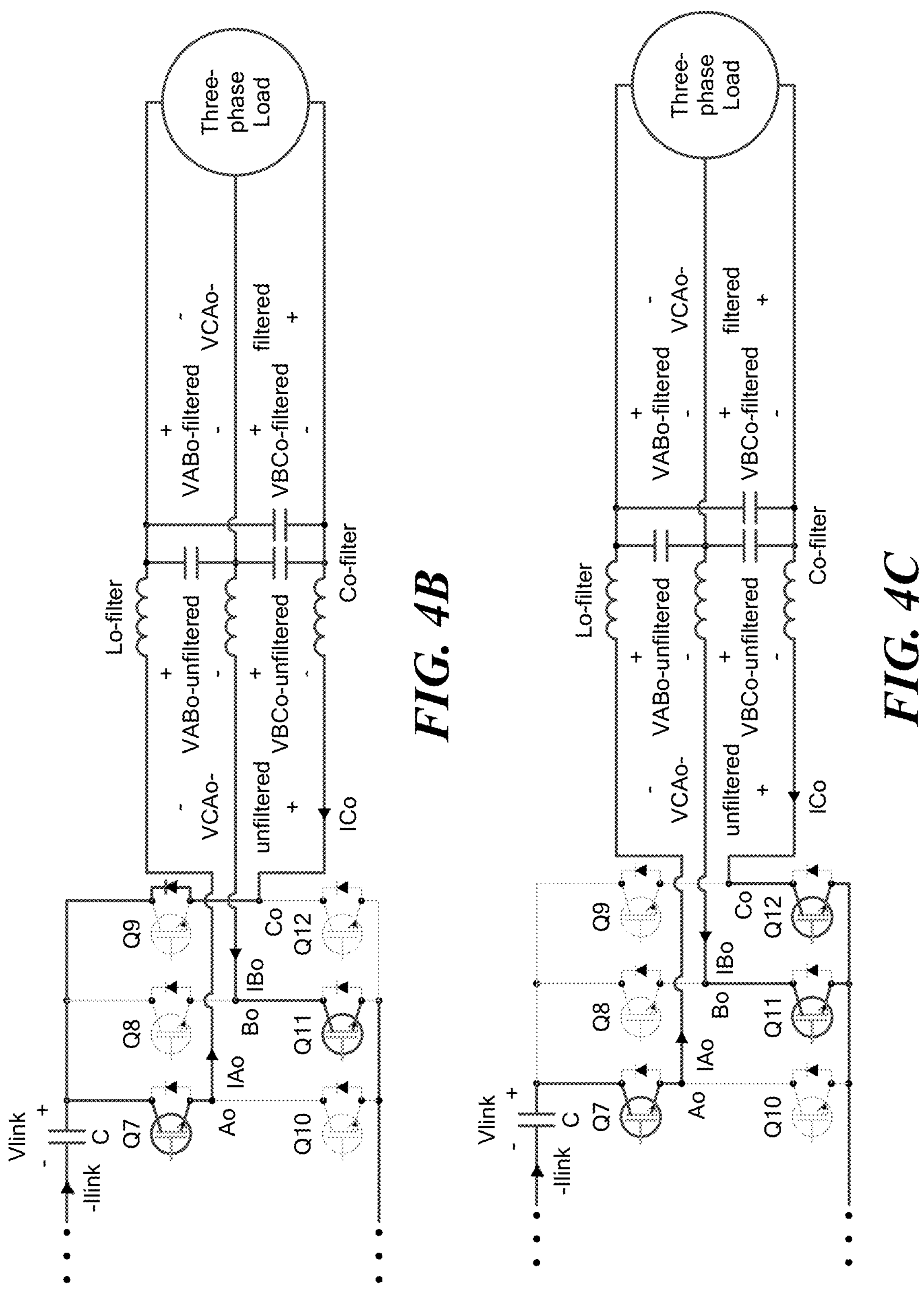
FIG. 4B illustrates a first capacitor charging mode of the isolated soft-switching Zeta converter of FIG. 4A.
FIG. 4C illustrates a second capacitor discharging mode of the isolated soft-switching Zeta converter of FIG. 4A.

Referring now to FIGS. 4A-4D, schematic illustrations of a Zeta converter 400 are shown in an embodiment utilizing the converter as an AC-AC converter. The converter 400 is again three-phase in nature. However, for this embodiment, the converter 400 is AC-AC in behavior with added switches (see Q7-Q12) and other features as detailed herein. FIG. 4A specifically, illustrates an isolated soft-switching converter for use in connection with a three-phase source and a three-phase load. FIG. 4B illustrates a capacitor charging mode of the converter of FIG. 4A. FIG. 4C illustrates a second capacitor discharging mode, FIG. 4D, a first inductor charging mode, and FIG. 4E, a second inductor charging mode.

Continuing with reference to FIGS. 4A-4E, the isolated Zeta-based three-phase AC-AC converter 400 with a small thin-film capacitor 475. A high frequency transformer may optionally be utilized. For the AC-AC embodiment behavior of the converter 400, each switching cycle consists of five operating modes. As shown in FIG. 4A, the first mode is transferring power from the link input inductor 440 ($L_{in}$) to the link capacitor 475. As shown in FIG. 4B, the second mode may include a link capacitor discharging mode for this first link capacitor 475. At the same time, first charging mode of the link input inductor 440 may occur. For this type of three-phase AC-AC Zeta configuration, there are two modes for link capacitor 475 discharging (see FIGS. 4B and 4C) and two modes for link input inductor 440 charging (see FIGS. 4D and 4E).

Over the course of the cycles, it is assumed for the illustrated embodiment that $$V_{ABO}^{ref},$$

the reference of the output voltage across phases AB, is positive and has the maximum absolute value among the three-phase output line-to-line voltages. The other line-to-line reference voltages $$V_{BCO}^{ref}$$

and $$V_{CAO}^{ref},$$

are negative and the absolute value of $$V_{CAO}^{ref}$$

which is smaller than $$V_{BCO}^{ref}.$$

The polarities and values of the output line-to-line voltages determine which switches (Q7-Q12) at the output side need to be turned on or off during each cycle. It is also assumed that $$I_A^{ref},$$

the reference current of phase A, is positive and has the maximum absolute value among three-phase currents.

$$I_B^{ref}$$

and $$I_C^{ref},$$

are negative and the absolute value of $$I_C^{ref}$$

is smaller than $$I_B^{ref}.$$

This information is used to determine the input-side switching pattern (e.g. Q1-Q6). It is obvious that based on the absolute values of input currents, we have different zones and switching patterns.

As shown in FIG. 4A, during the first mode, all switches are off, and the link capacitor 475 is charged by the link input inductor 440 current ($I_{in}$) through the load-side anti-parallel diodes. The link capacitor voltage increases during this mode until a predetermined amount of power is transferred.

Once the link is charged sufficiently, proper switches (Q1-Q12) from the input and output sides are turned on and the first mode is completed. As depicted in FIG. 4B, in the first discharging mode, the link capacitor 475 is discharged to the three-phase load 450 with the second-highest load current ($I_{Bo}$). During this mode, Q7, Q11, and the anti-parallel diode of Q9 conduct the current and discharge the link capacitor 475. When the average of corresponding output line-to-line voltage ($V_{BCO}$) meets its reference value $$\left(V_{BCO}^{reference}\right),$$

this mode ends and another, second capacitor discharging mode initiates.

The second discharging mode discharges the link capacitor 475 with the highest load current ($|I_{Ao}|$ in FIG. 4C). During this mode, Q7, Q11, and Q12 are ON to supply the three-phase load 450. This mode lasts until the remaining energy of the link capacitor 475 discharges to the load 450. During these two discharging modes, the unfiltered line-to-line voltages and the voltage across the off-state switches (Q8-Q10) at the load side are equal to $V_{in}+V_{link}$, and the value of $V_{in}$ depends on the charging mode status.

Figures 4D, 4E:
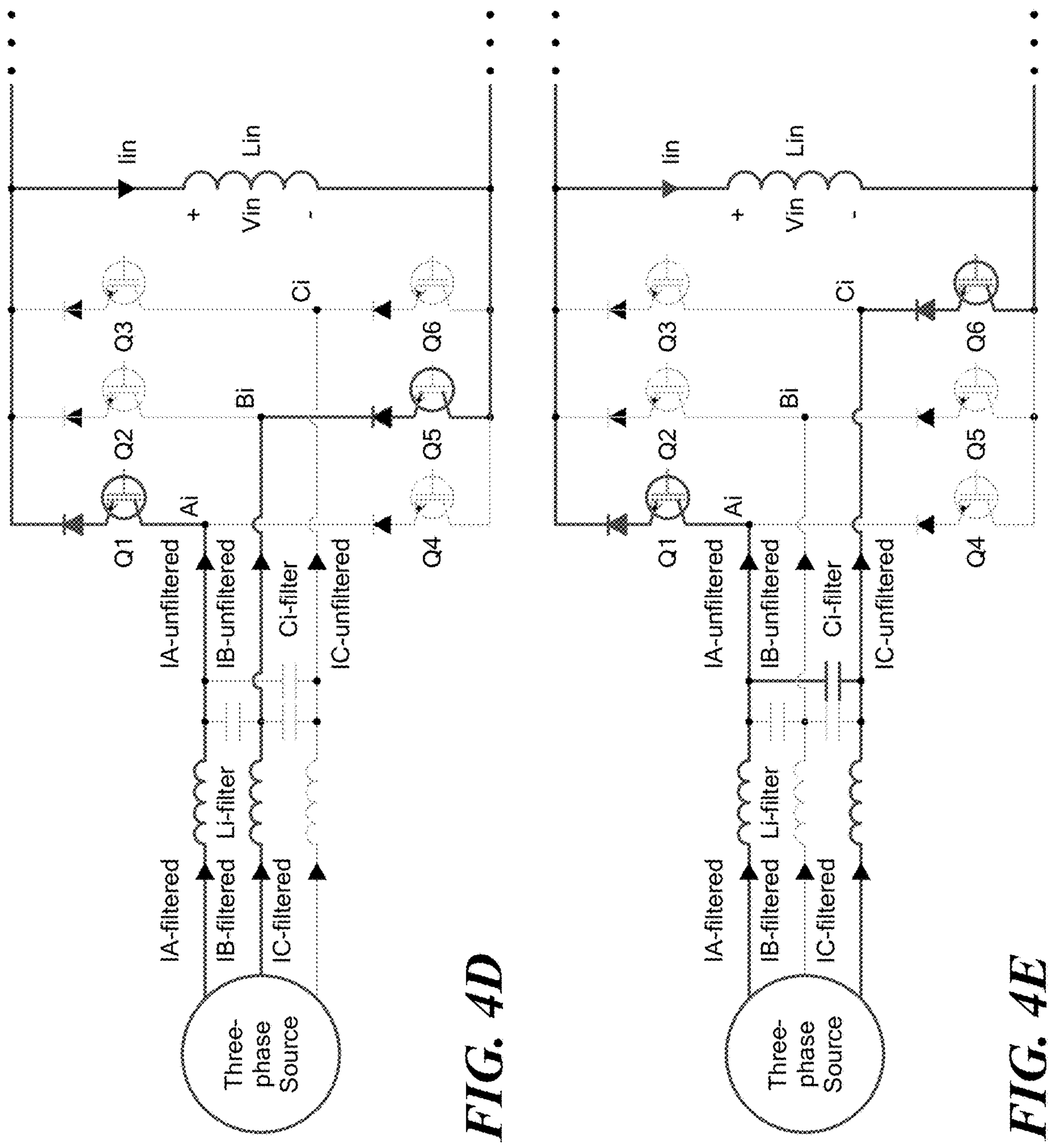
FIG. 4D illustrates a first inductor charging mode of the isolated soft-switching Zeta converter of FIG. 4A.
FIG. 4E illustrates a second inductor charging mode of the isolated soft-switching Zeta converter of FIG. 4A.

Referring now to FIG. 4D, simultaneously with the first charging mode, switches Q1 and Q5 conduct such that the highest line-to-line voltage ($V_{AB}$) appears across the link input inductor 440 ($L_{in}$) of FIG. 4A. As soon as the average value of the second-highest current $$(I_B^{average})$$

meets its reference value $$(I_B^{ref}),$$

the switching status will change to initiate the noted second inductor charging mode.

In the second charging mode illustrated in FIG. 4E switches Q1 and Q6 are ON, and the voltage over the link input inductor 440 ($L_{in}$) is equal to $V_{CA}$. This mode continues until when $$I_C^{average}$$

meets $$I_C^{ref}.$$

It should be noted that the link input inductor charging modes and the link capacitor discharging modes are controlled independently and they have different durations, for example, through a control board 180 as illustrated in FIG. 1A.

Although the first link capacitor discharging mode and first link input inductor charging mode start at the same time they do not end simultaneously. As a result, the second link capacitor discharging mode and the second link input inductor charging mode do not start simultaneously. It may be assumed for the embodiment illustrated that the first link input inductor charging mode is longer than the first link capacitor discharging mode.

Figure 6A:
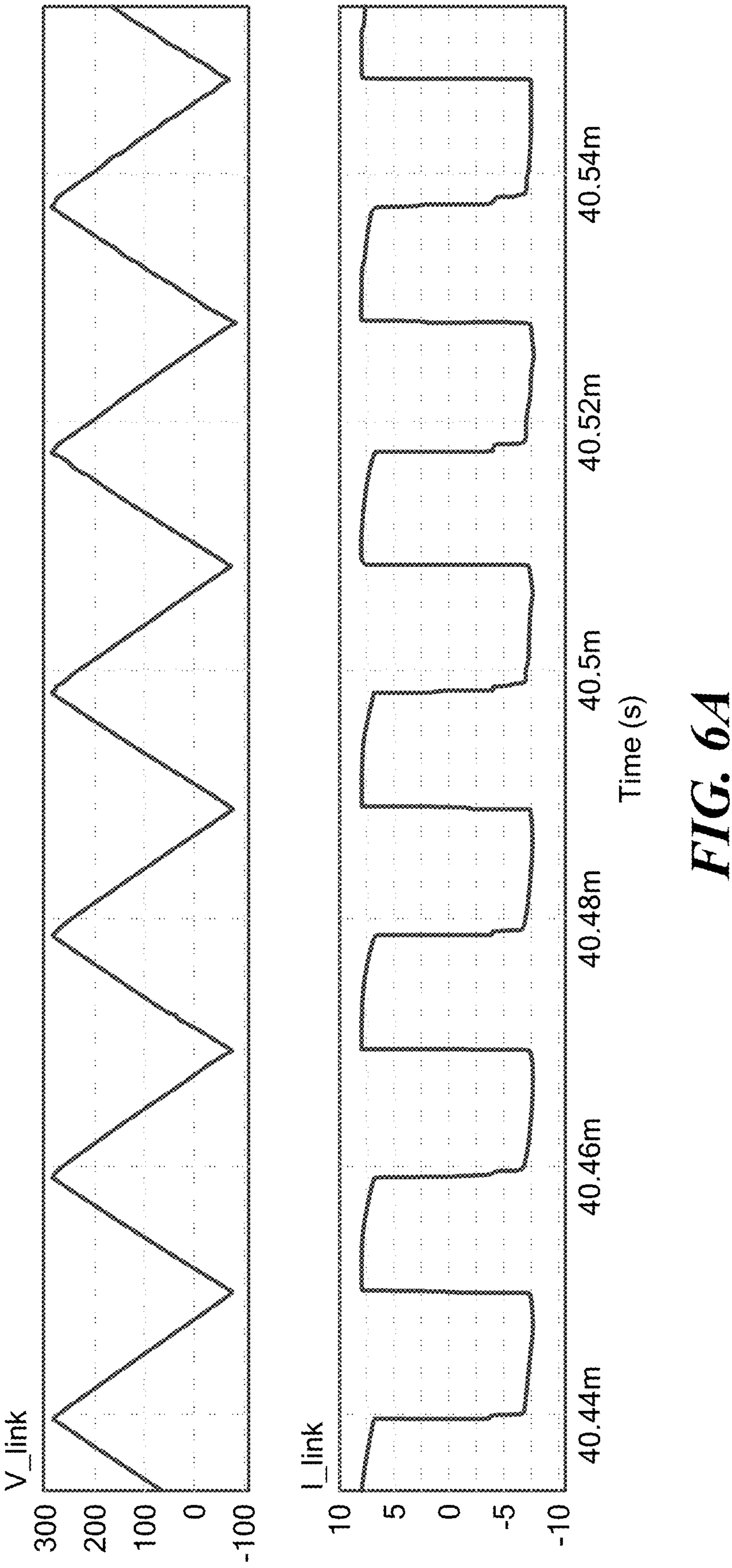
FIG. 6A-6C are charts depicting behavior of the Zeta converter employed as an AC-AC converter as noted in FIGS. 4A-4D. Specifically, FIG. 6A notes link capacitor voltage and 6B illustrates unfiltered output voltages and unfiltered input currents.
Figure 6B:
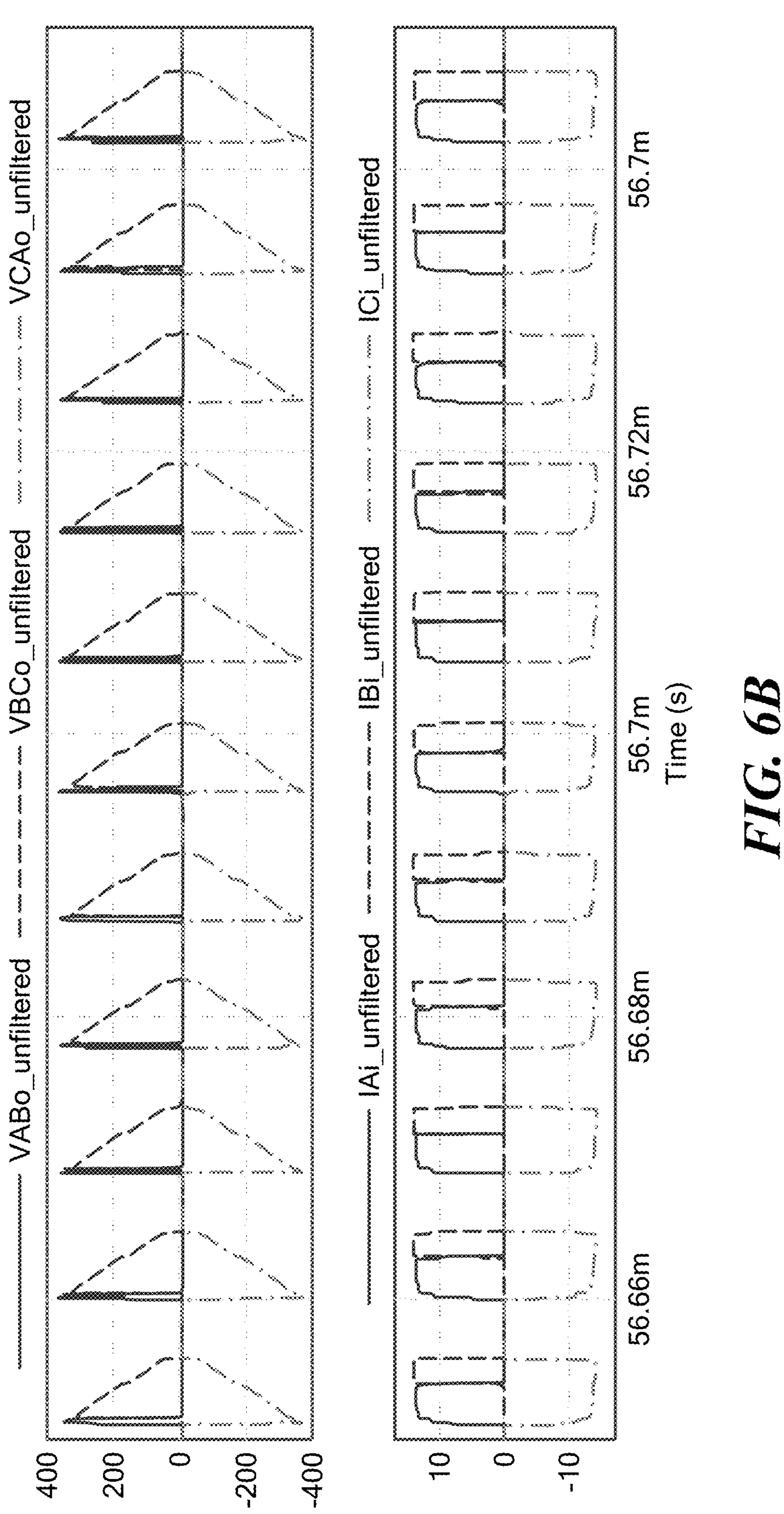
Figure 6C:
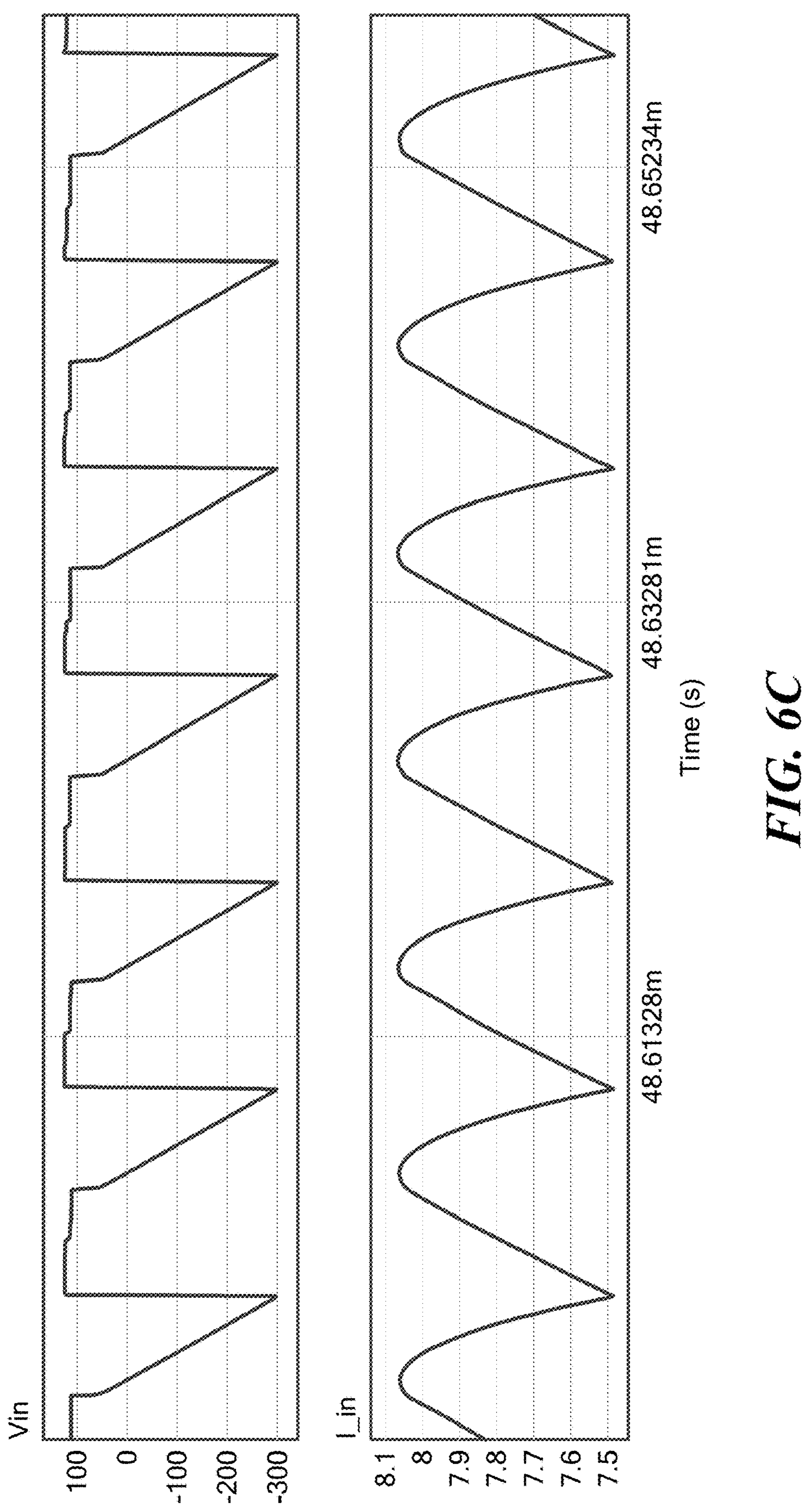

Returning now to the AC-AC Zeta-based converter arrangement illustrated in FIG. 4A-4E, FIGS. 6A-6C illustrate charts that represent voltage and other behavior of the system. Specifically, FIG. 6A notes link capacitor voltage and 6B illustrates unfiltered output voltages and unfiltered input currents. FIG. 6C illustrates exemplary link inductor voltage and current wave forms.

Figure 4F:
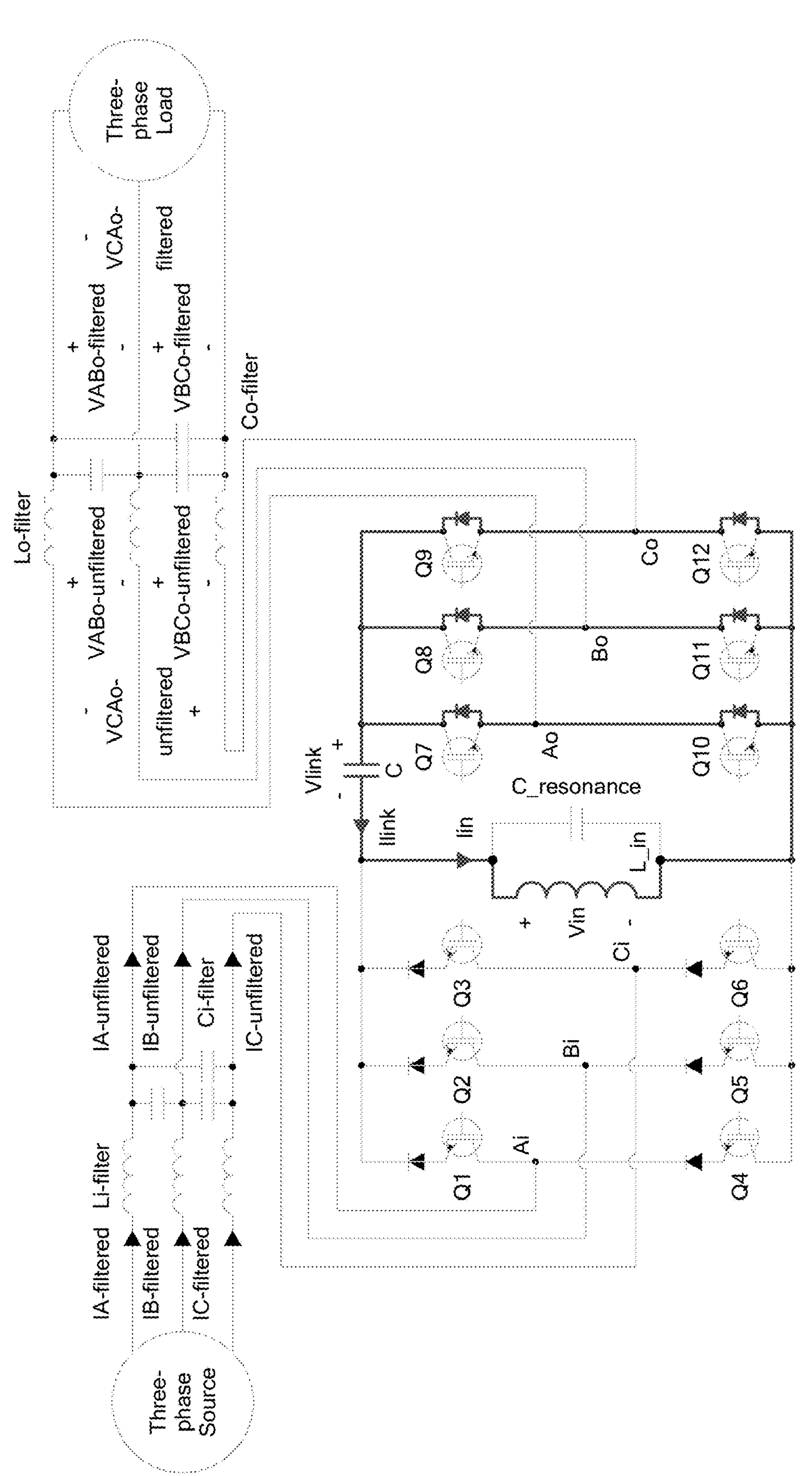
FIG. 4F is another series of schematic diagrams of the converter of FIGS. 4A-4D but in a non-isolated soft-switching embodiment during a first mode (a), resonating modes (b), a first discharging mode (c), a second discharging mode (d), a first charging mode (e) and a second charging mode (f).
Figure 4F:
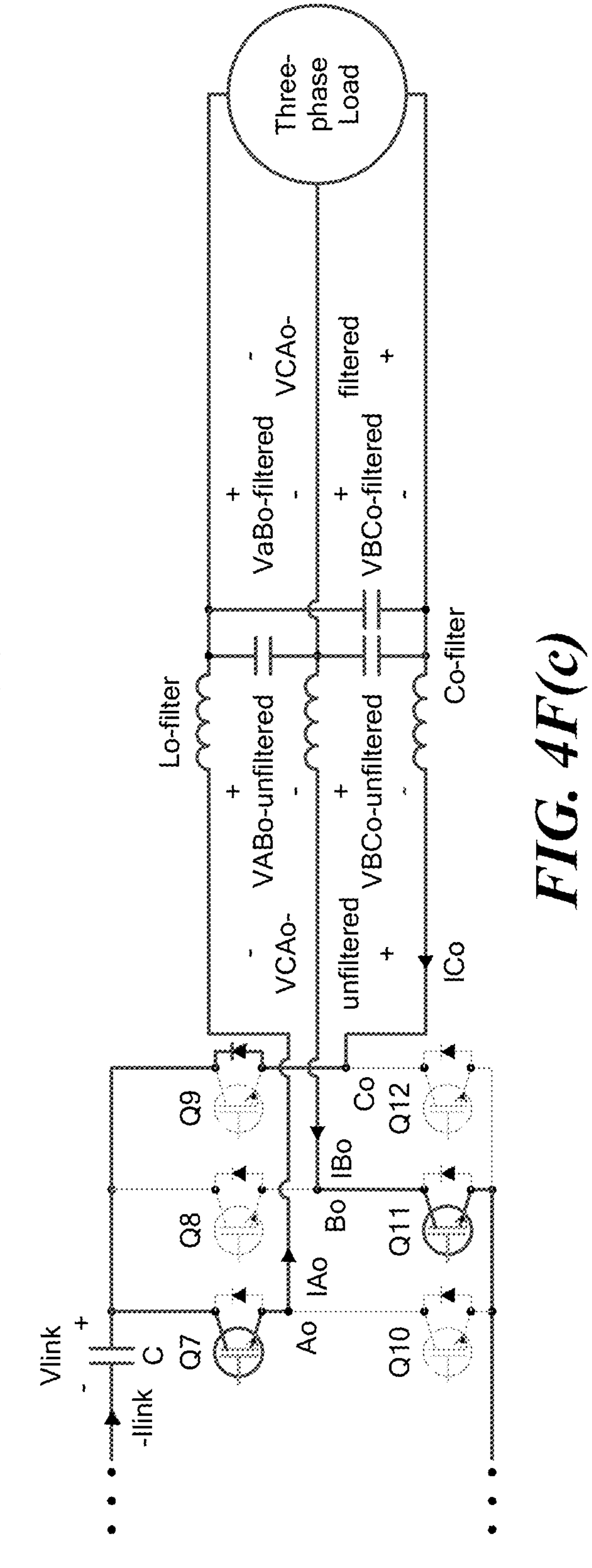
Figure 4F:
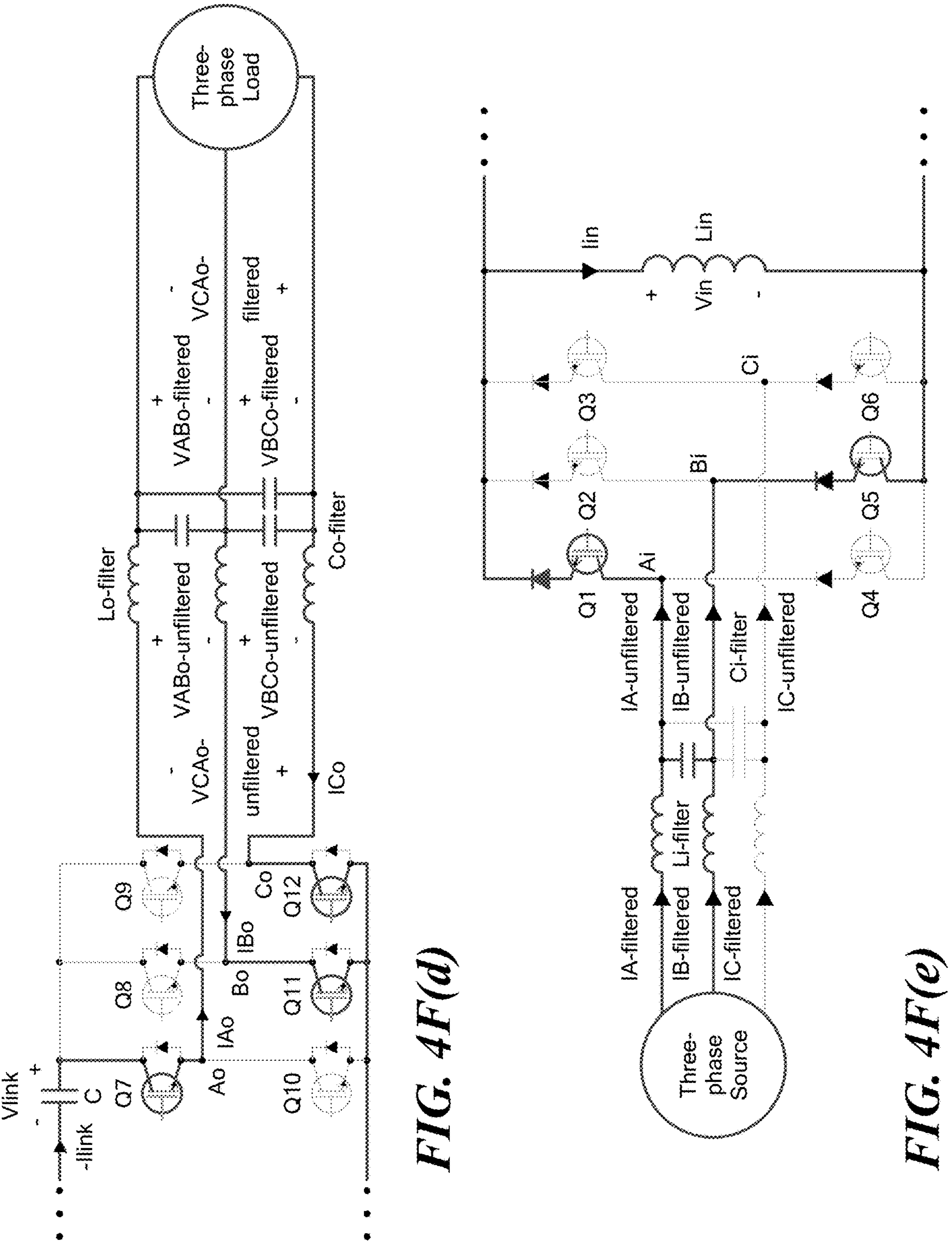
Figure 4F:
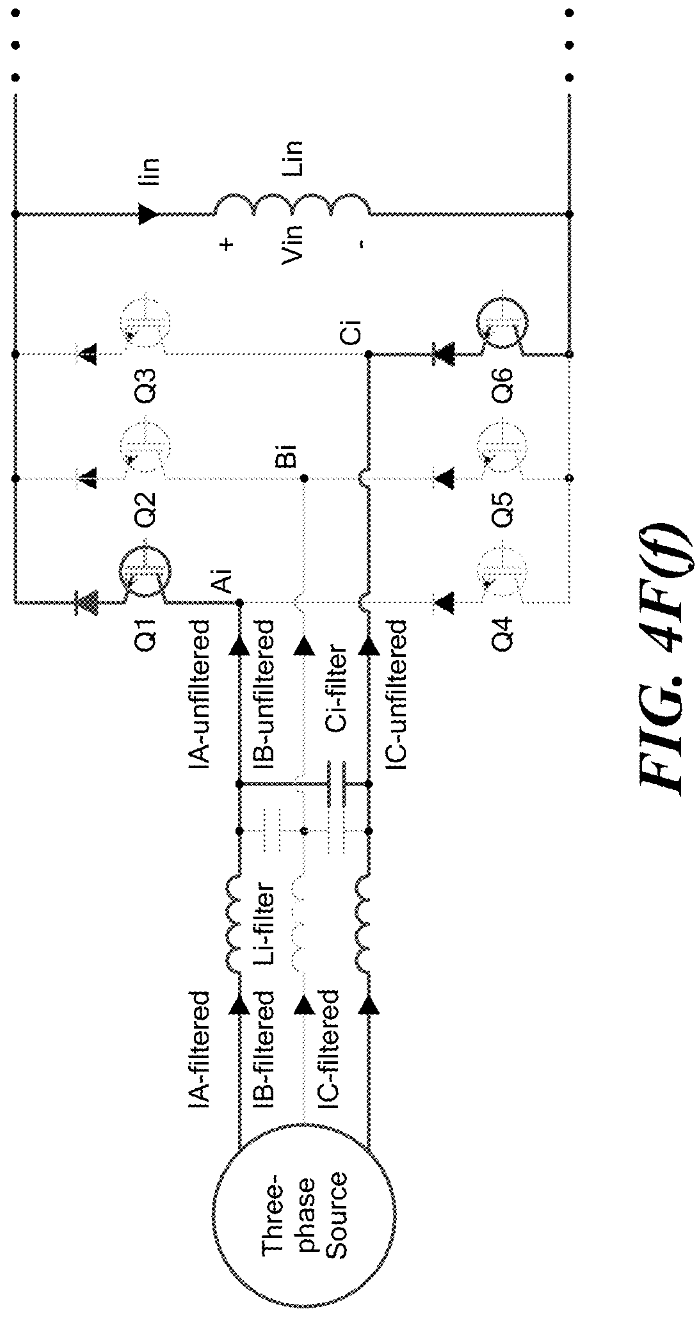
Figure 4G:
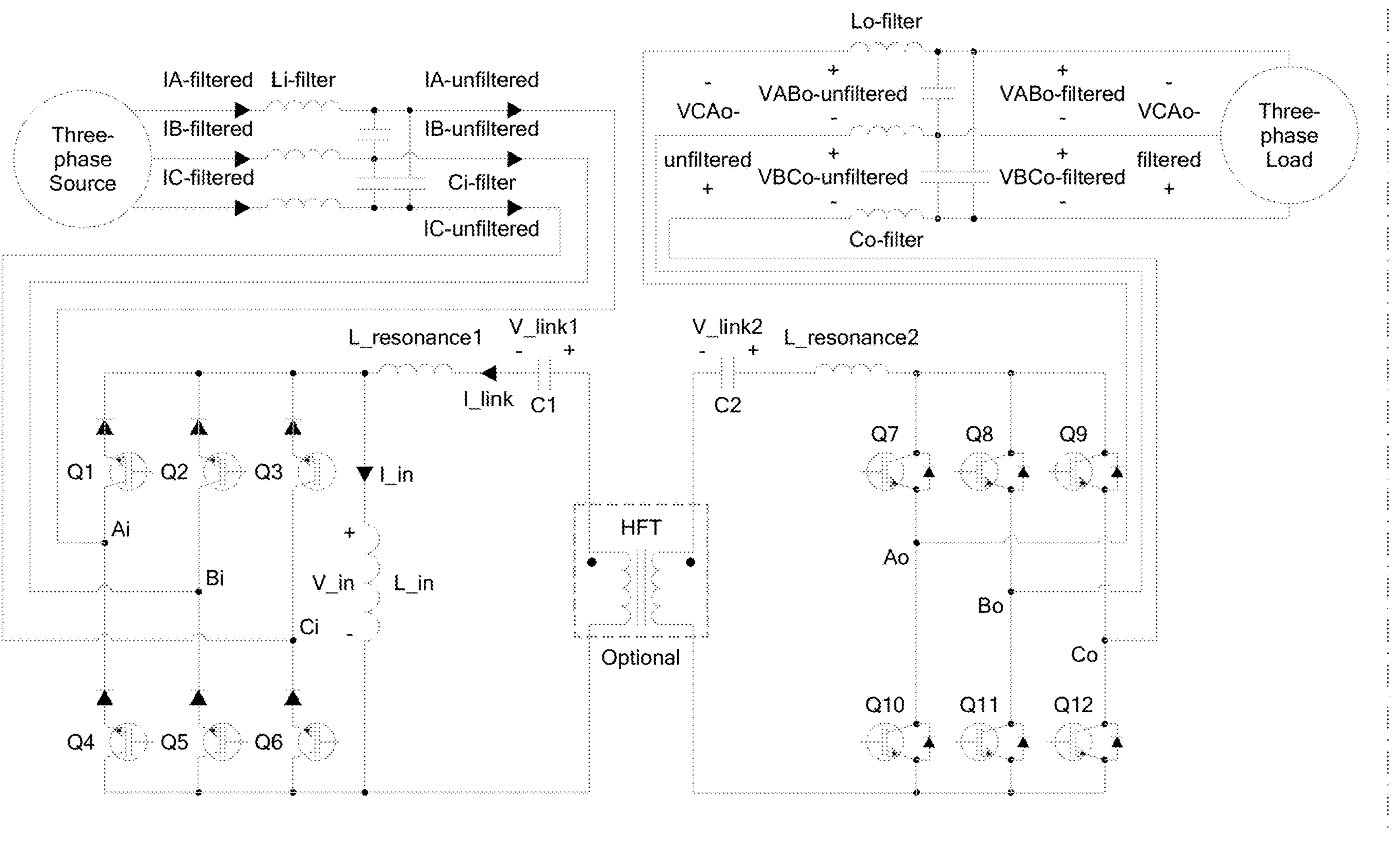
FIG. 4G is a schematic diagram (a) illustrating the AC-AC converter with zero current switchings and a chart (b) illustrating voltage and current waveforms of the link capacitor with zero current switchings.
Figure 4G:
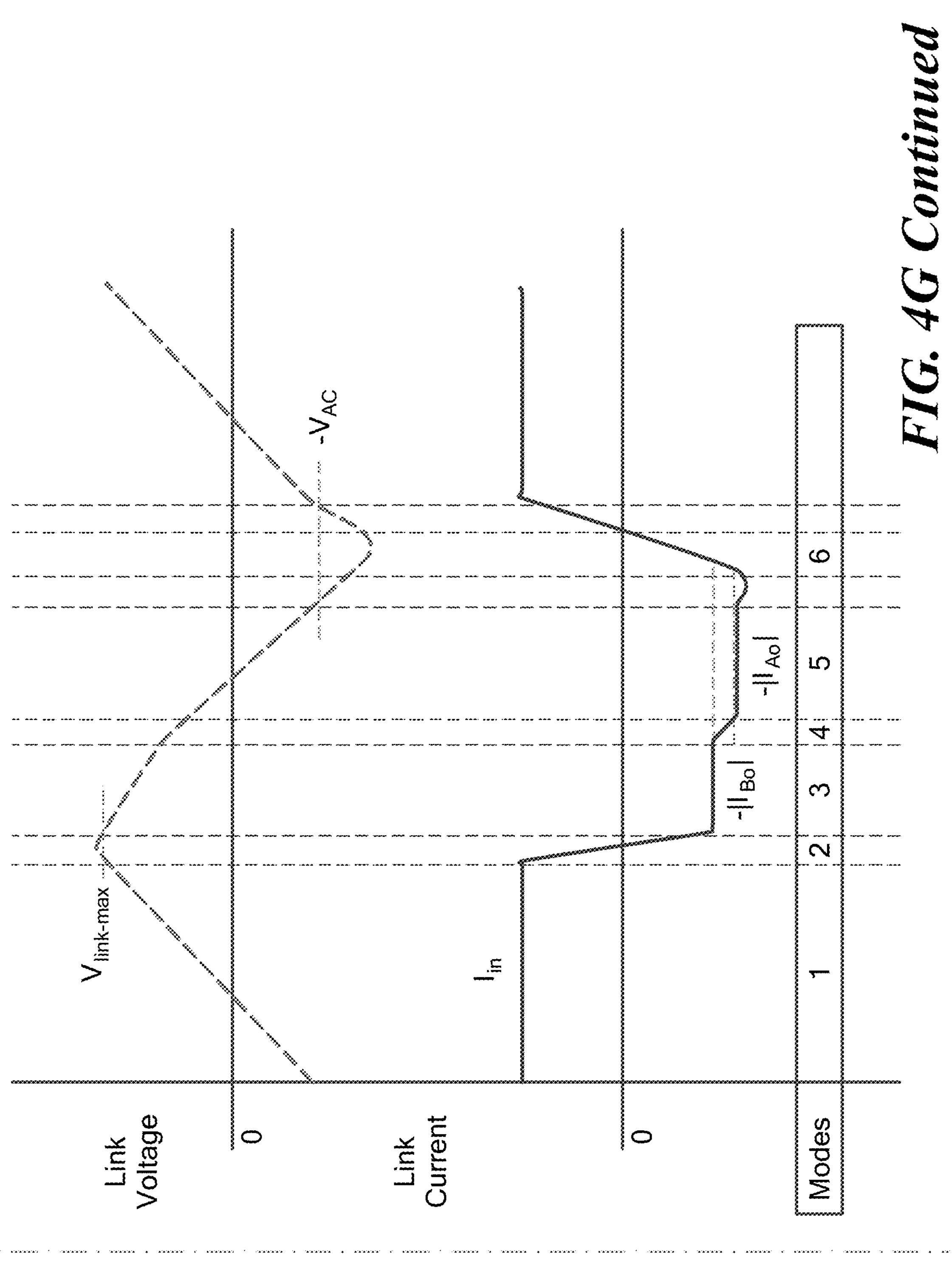
Figure 4H:
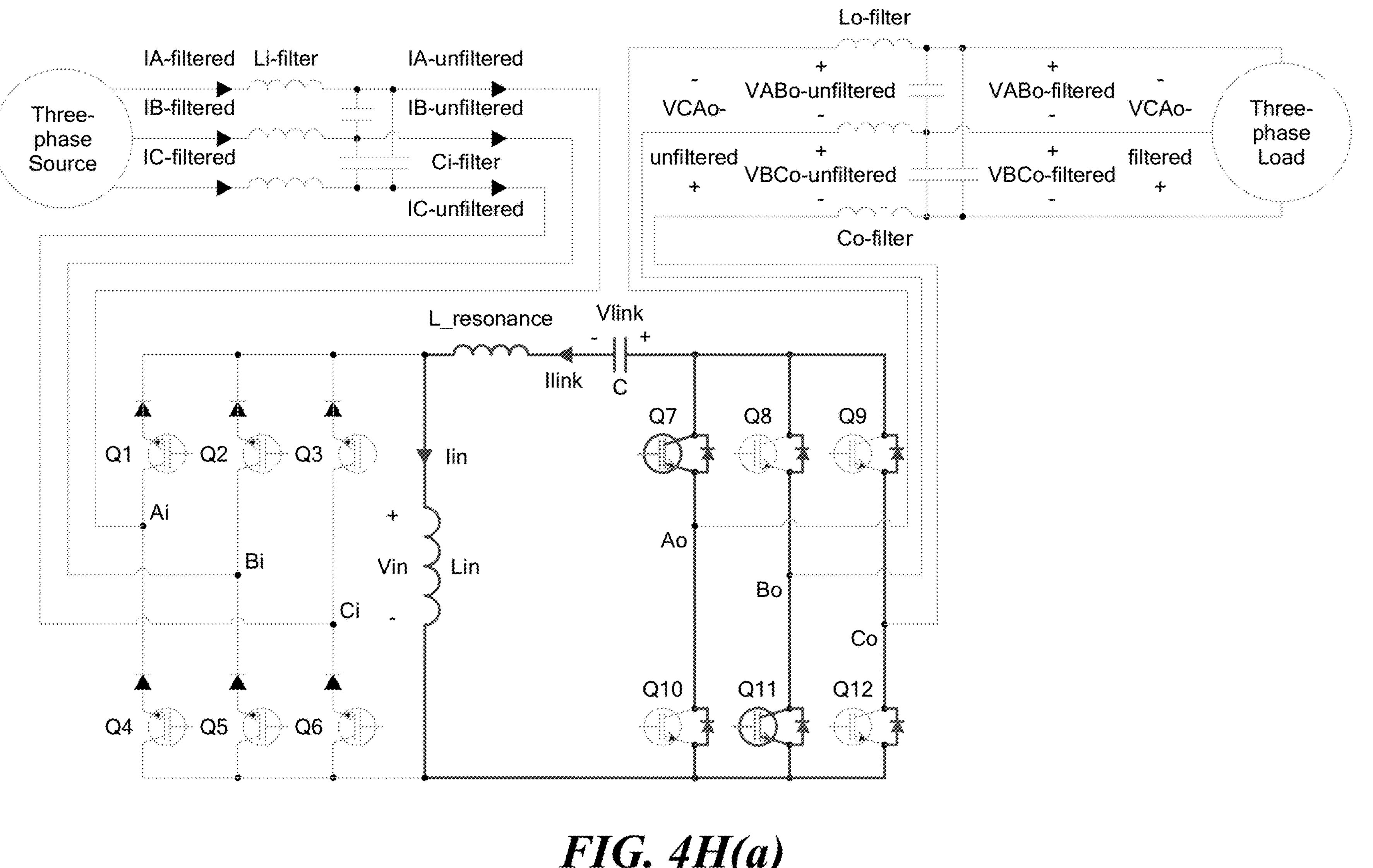
FIG. 4H is another schematic diagram illustrating the AC-AC converter with zero current switchings during mode 1 (a), a first charging mode (b), a second charging mode (c), a first resonating mode (d), a first discharging mode (e), a second resonating mode (f), a second discharging mode (g) and a third resonating mode (h).
Figure 4H:
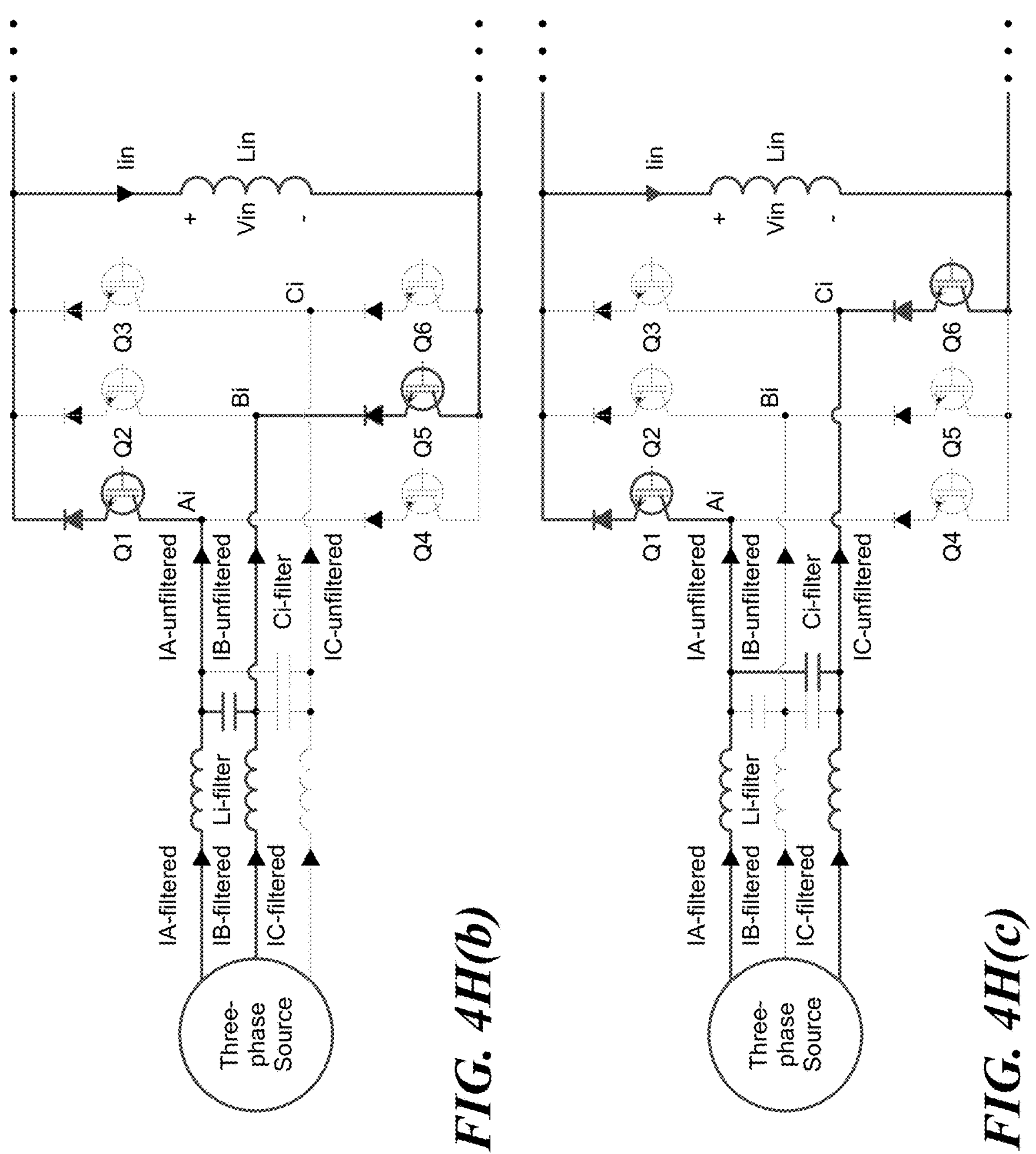
Figure 4H:
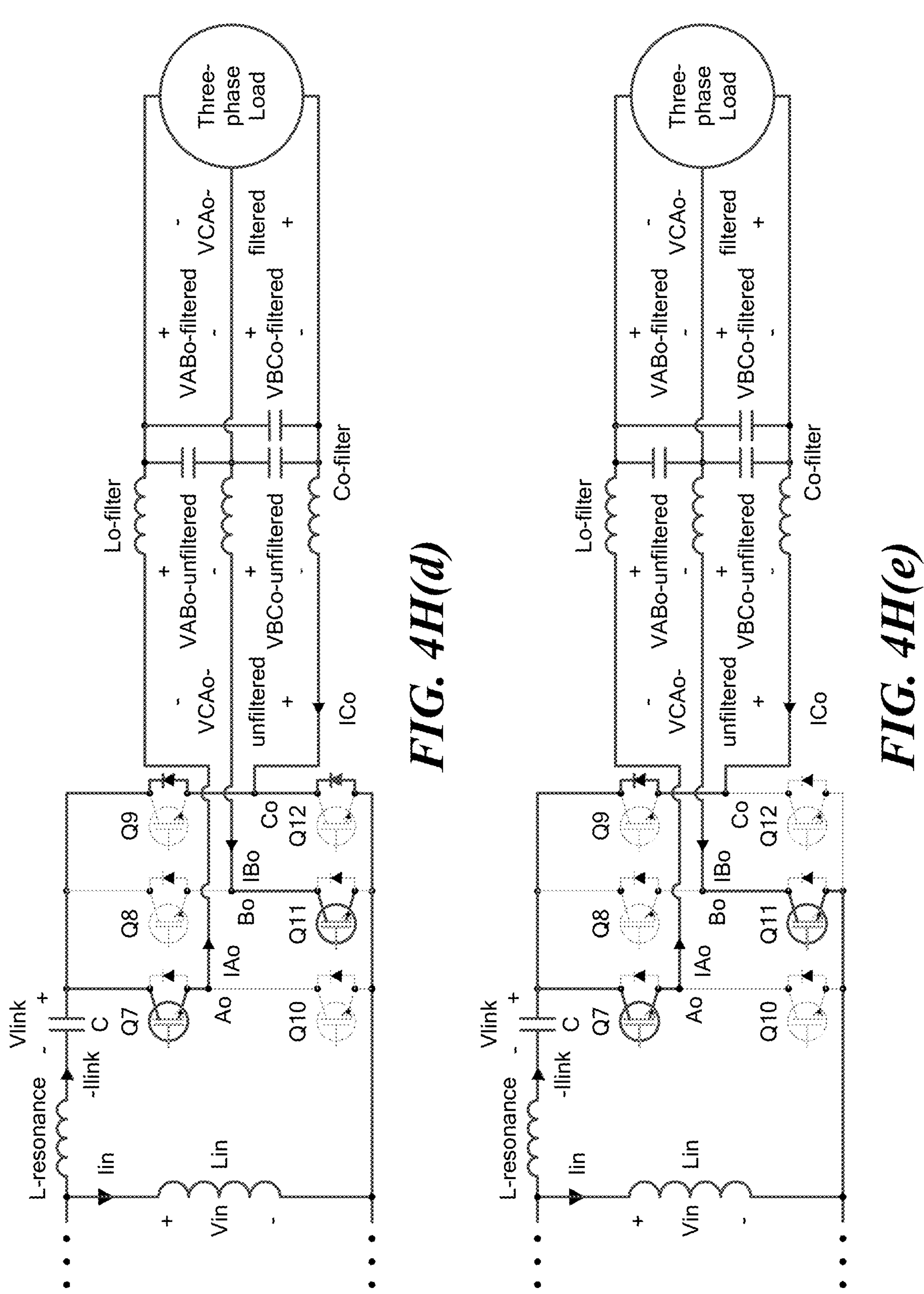
Figure 4H:
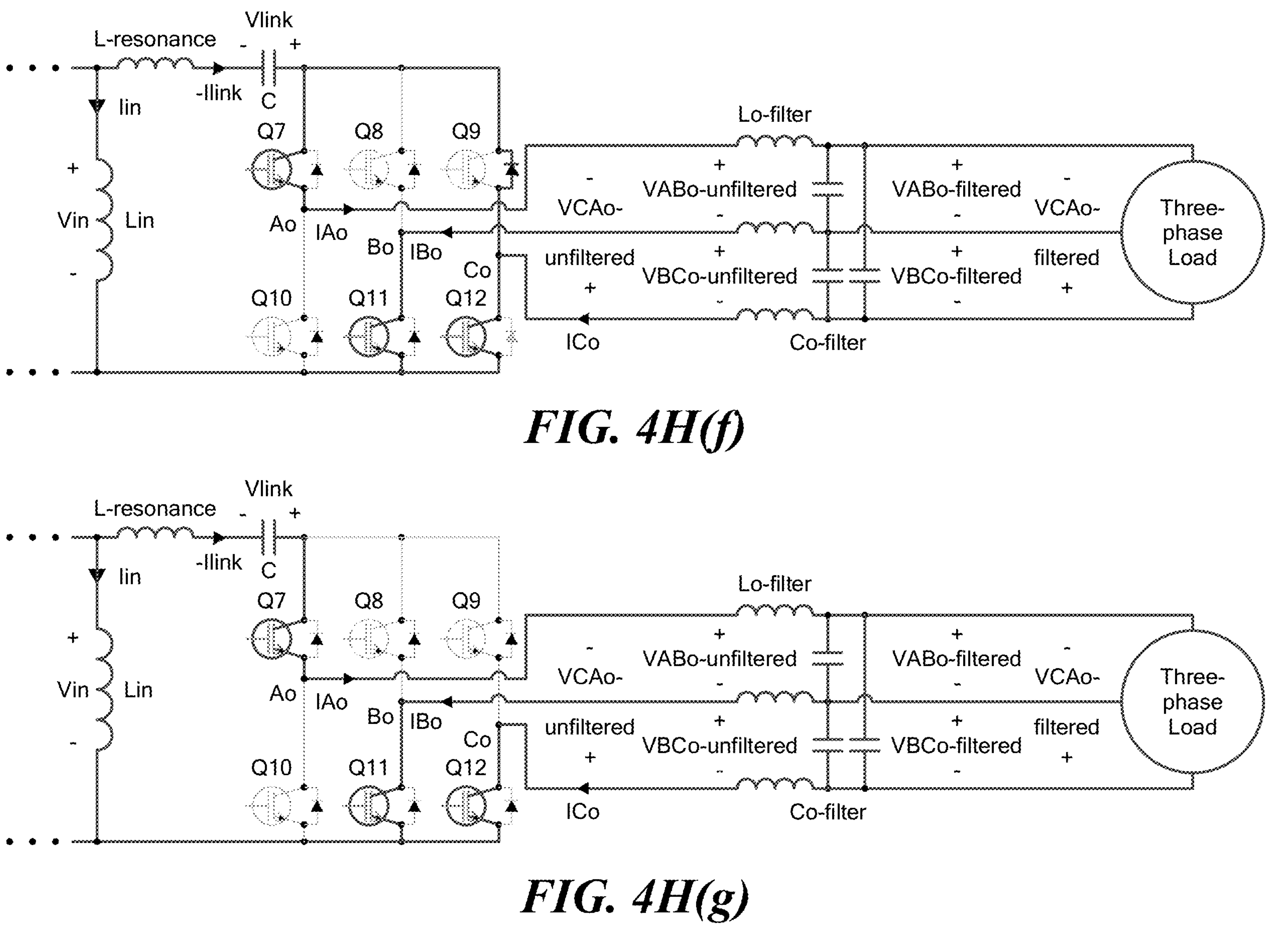
Figure 4H:
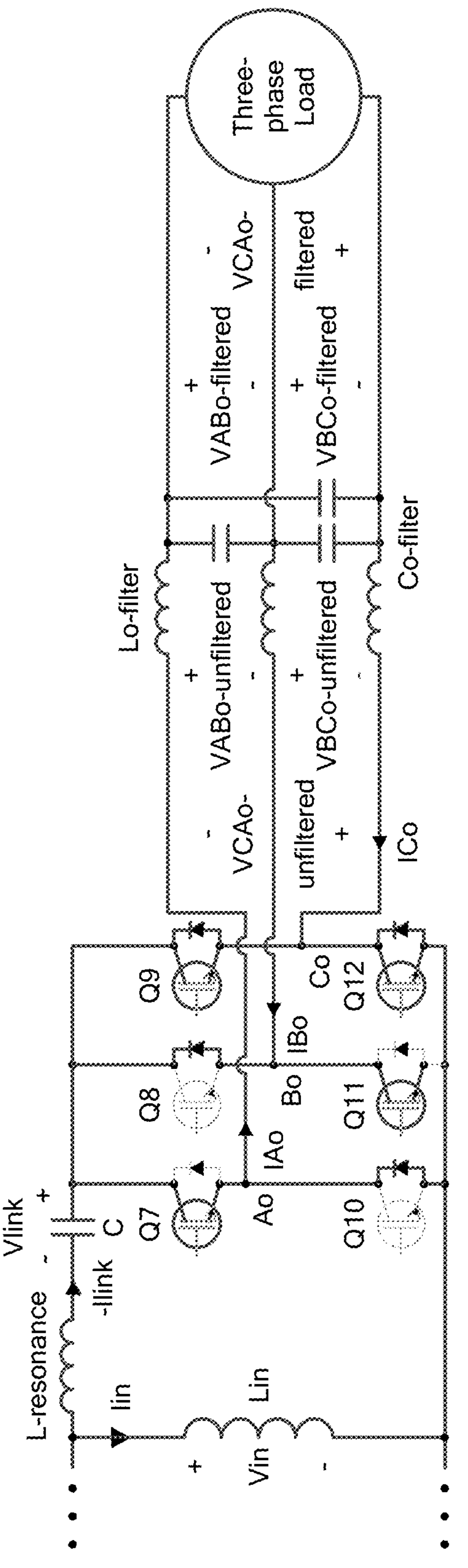

FIG. 4A, in particular shows the isolated soft-switching three-phase AC-AC converter. FIG. 4L shows a similar isolated soft-switching AC-AC converter to FIG. 4A but more generally configured for a multi-phase source and multi-phase load, wherein n additional input switch pairs (e.g., Q1*n* and Q2*n* as shown) and m additional output switch pairs (e.g., S1*m* and s2*m*) are provided, wherein n and m correspond to a number of additional phases of the multi-phase source and load phases of the multiphase load.

Figure 8A:
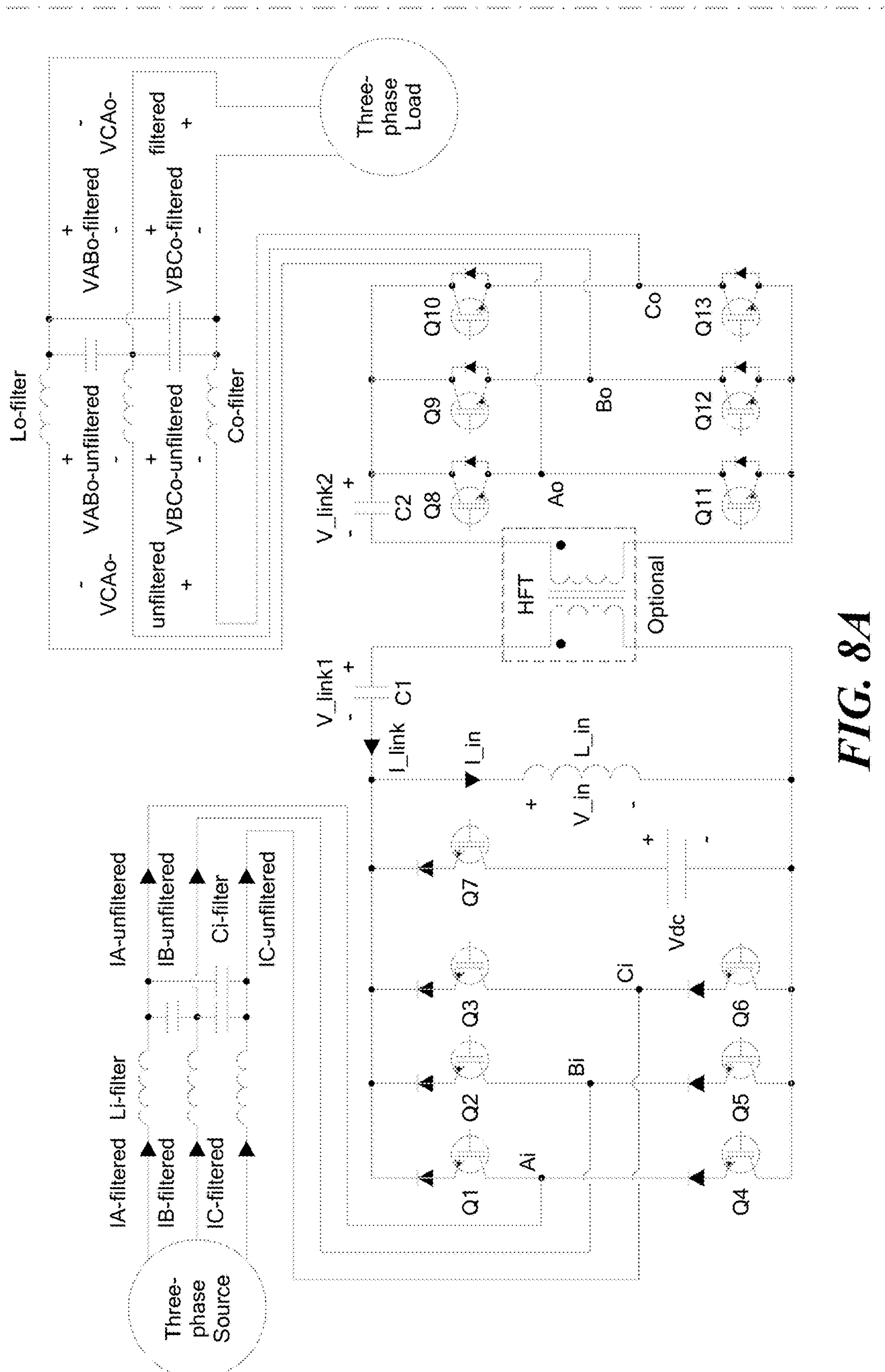
FIG. 8A is a schematic diagram (a) illustrating a Zeta-based multiport converter utilizing a transformer and employing a hard switching, isolated configuration and a chart (b) illustrating exemplary voltage and current waveforms of the link capacitor and input inductor voltage in the converter.
Figure 8B:
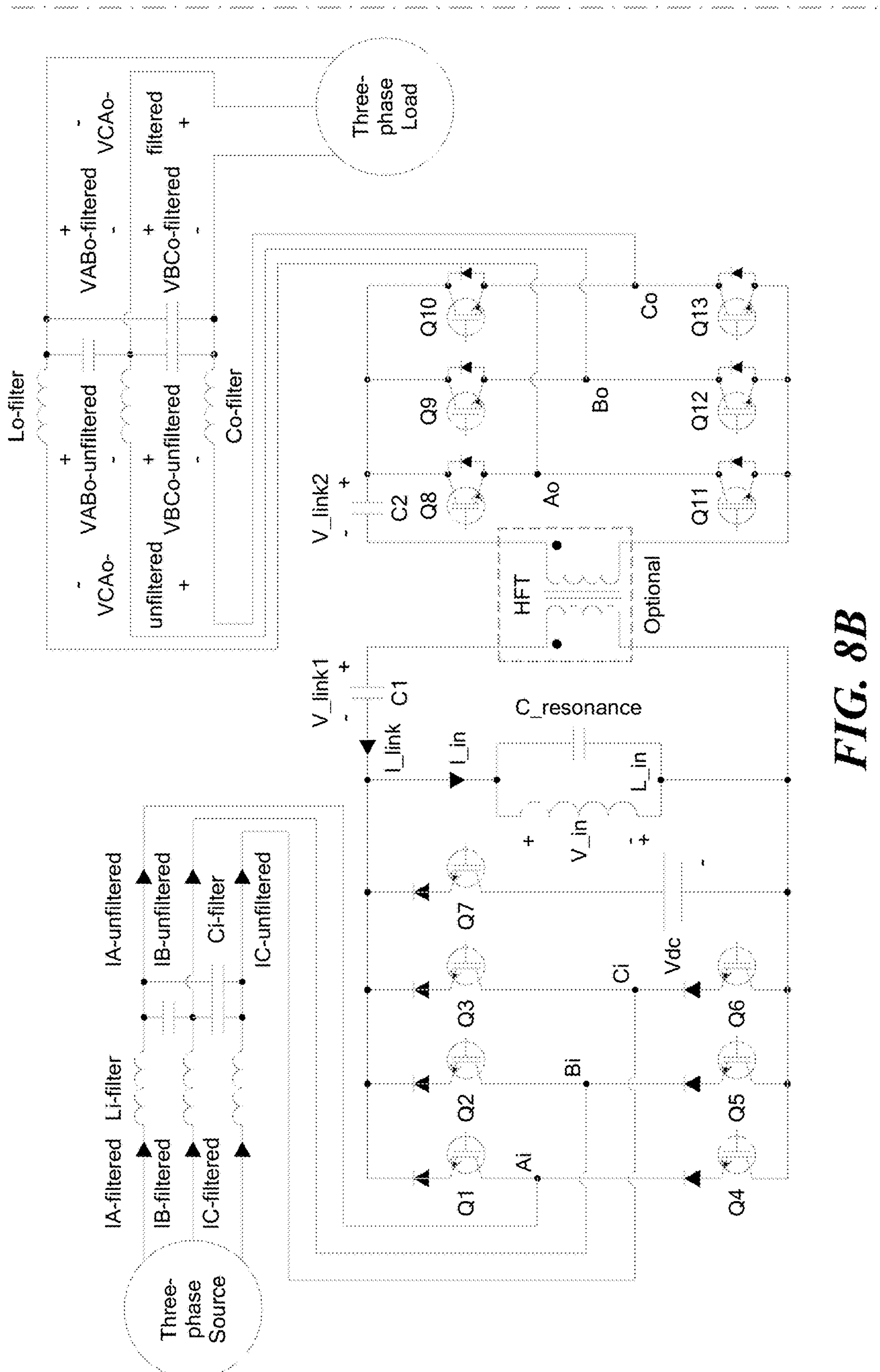
FIG. 8B is a schematic diagram (a) illustrating the multiport converter of FIG. 8A but employing a soft-switching, isolated configuration and a chart (b) illustrating link current and input inductor voltage.

FIG. 8B shows a similar isolated soft-switching converter to FIGS. 4A and 4L but configured instead for a multi-source, AC and DC input and an AC three-phase load, wherein the AC and DC input includes a three-phase source and a DC source (e.g., a battery) and wherein the DC source and an additional input switch (Q7) are added at the input stage of the converter.

Figure 4I:
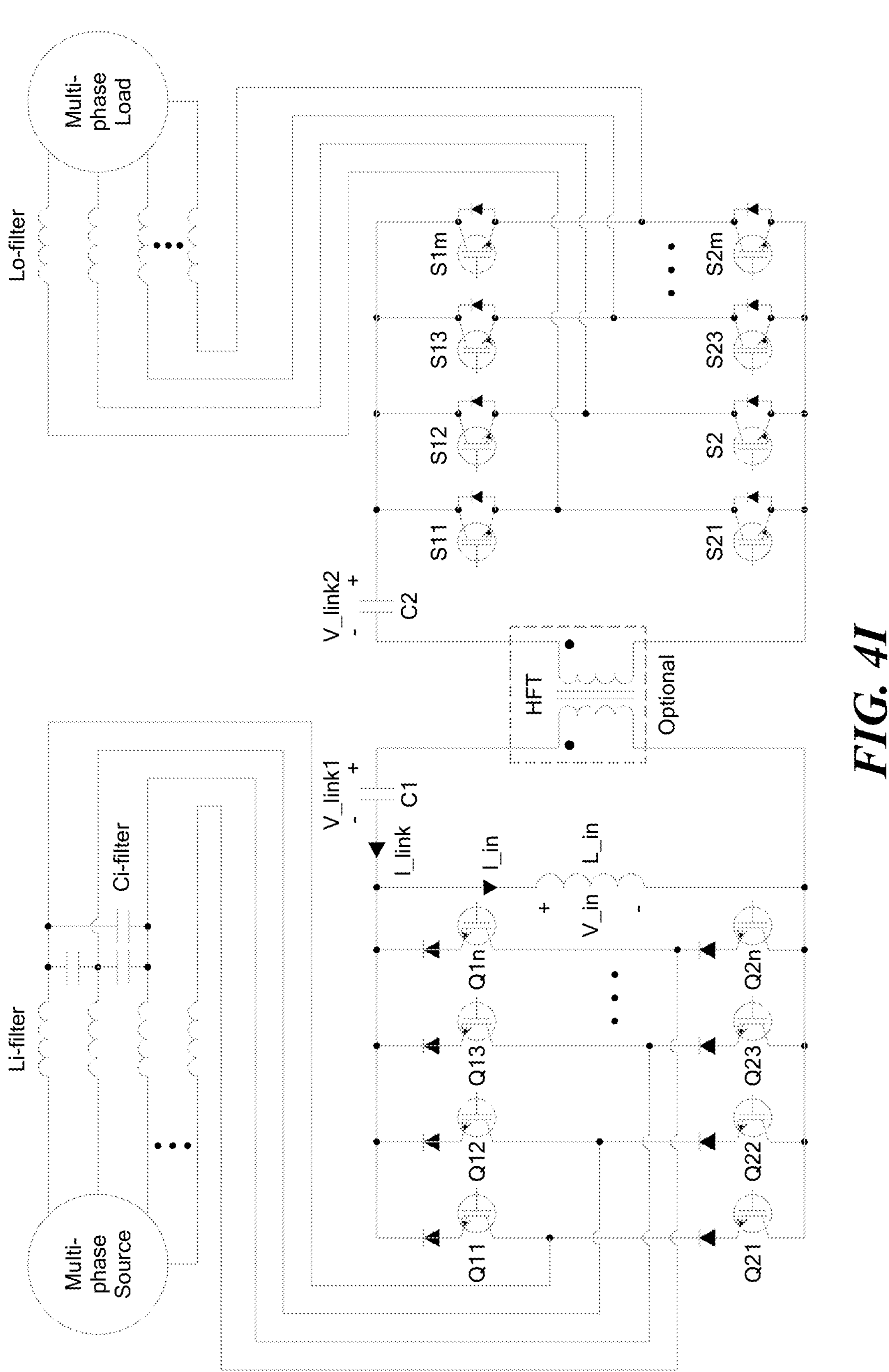
FIG. 4I is schematic diagram illustrating a multi-phase converter embodiment of the AC-AC converter of FIG. 4H utilizing a transformer and employing a hard switching, isolated configuration.
Figure 4J:
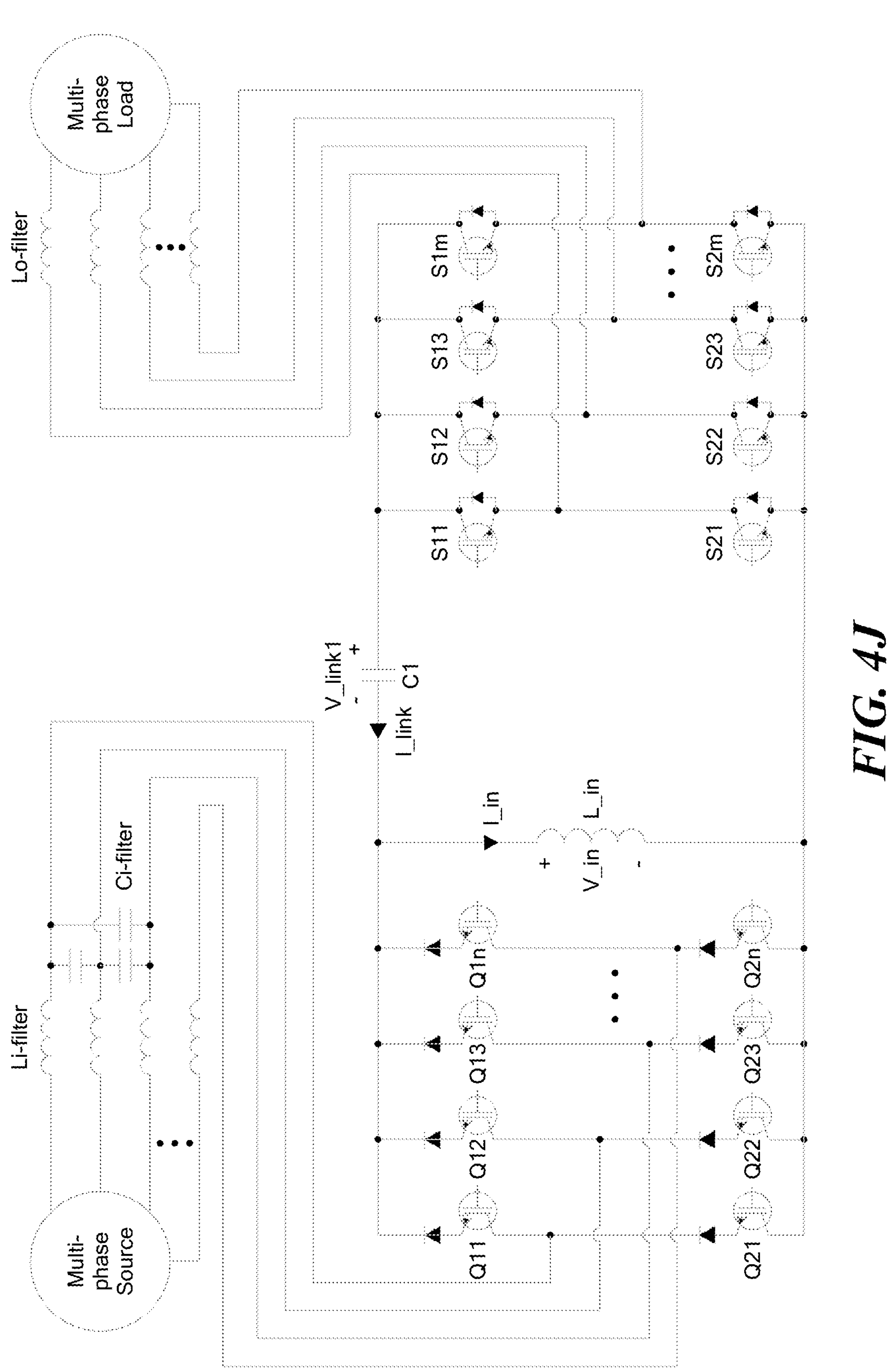
FIG. 4J is a schematic diagram illustrating the multi-phase converter of FIG. 4I but employing a hard switching, non-isolated configuration.
Figure 4K:
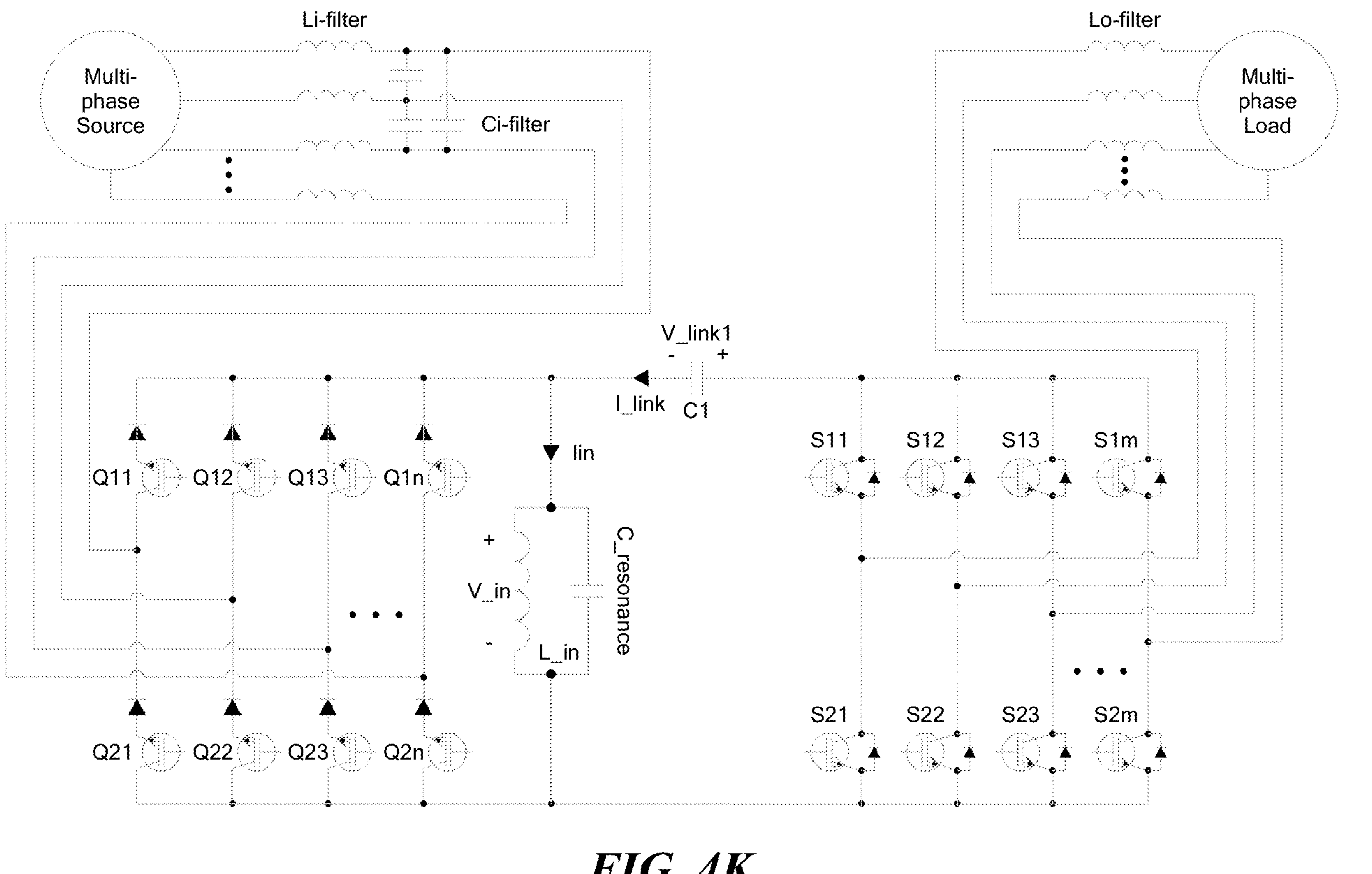
FIG. 4K is a schematic diagram illustrating the multi-phase converter of FIG. 4I but employing a soft-switching, non-isolated embodiment.
Figure 4L:
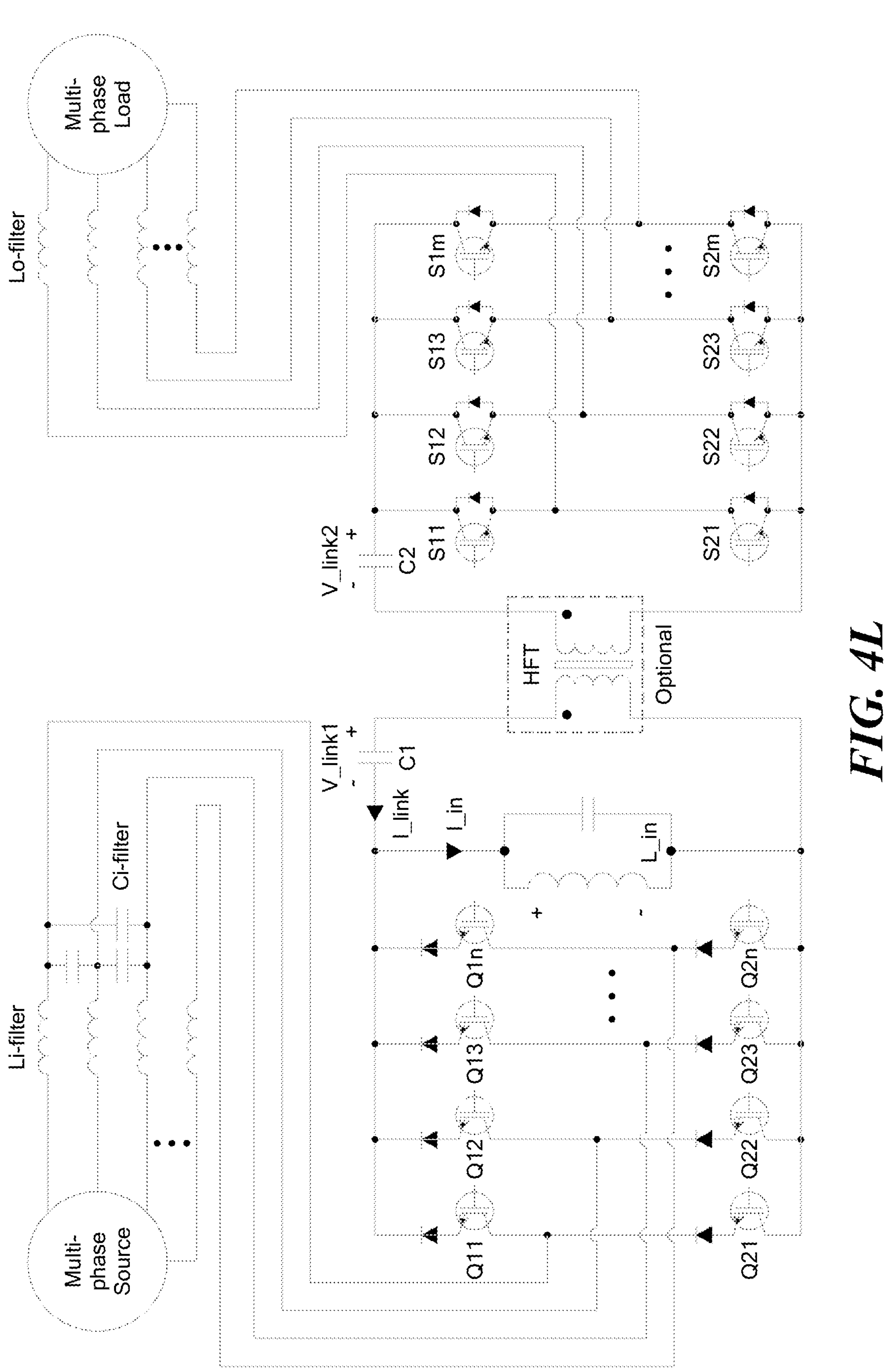
FIG. 4L is a schematic diagram illustrating the multi-phase converter of FIG. 4I but employing a soft-switching, isolated embodiment.
Figure 5:
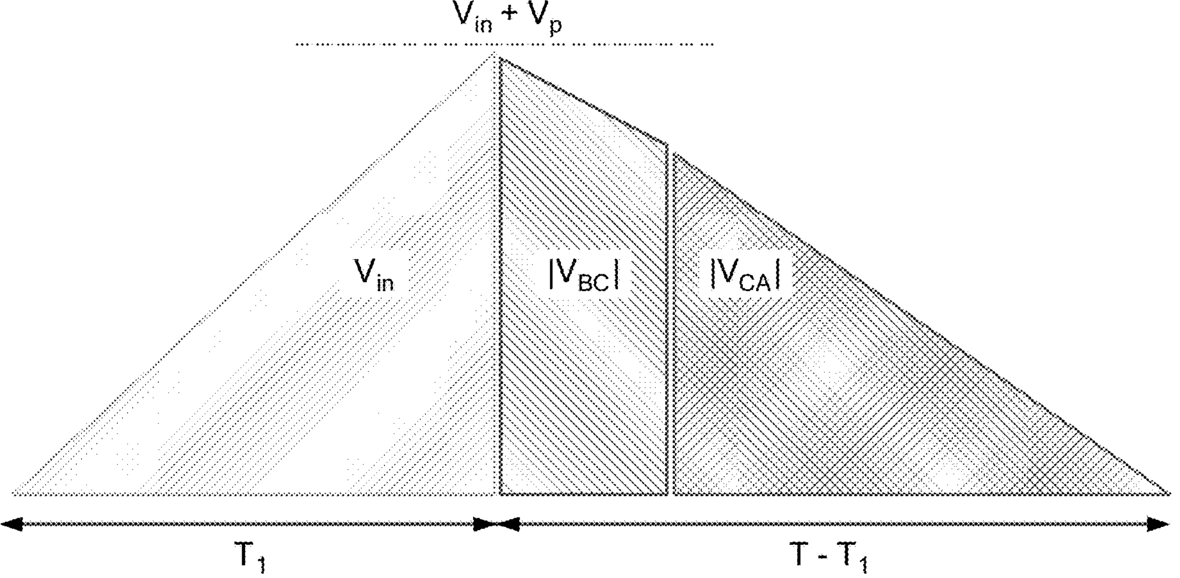
FIG. 5 is a chart depicting unfiltered line-to-line voltages for an embodiment of a Zeta converter as utilized herein.

FIG. 4I shows a similar isolated AC-AC multi-phase converter to FIG. 4L but employs hard switching instead of soft switching. Like FIG. 4L, n additional input switch pairs (e.g., Q1*n* and Q2*n* as shown) and m additional output switch pairs (e.g., S1*m* and s2*m*) are provided, wherein n and m correspond to a number of additional phases of the multi-phase source and load phases of the multiphase load.

FIG. 8A shows a similar isolated hard-switching converter to FIG. 4I but configured instead for a multi-source, AC and DC input and an AC three-phase load, wherein the AC and DC input includes a three-phase source and a DC source (e.g., a battery) and wherein the DC source and an additional input switch (Q7) are added at the input stage of the converter.

A non-isolated soft-switching converter and its behavior during different modes is shown in FIG. 4F. During the first mode, all the switches are off, and the power is transferred from the link input inductor ($L_{in}$) to the link capacitor ($C_{link}$) via the output side anti-parallel diodes. When the link capacitor is fully charged from the input inductor during the first mode, The link input inductor current ($I_{in}$) becomes zero and diodes stop conducting under zero current switching (ZCS), and the resonating mode starts.

During the second mode, the input inductor resonates with its parallel capacitor (FIG. 4F(b)) and the link capacitor starts to discharge to the load (FIG. 4F(c)). This resonating mode lasts until when the link input inductor voltage becomes equal to $V_{AB}$ and provides zero voltage turn-on (ZVS) for the input-side switches to reduce power losses.

As depicted in FIG. 4F(c), in the first discharging mode, the link capacitor is discharged to the three-phase load with the second-highest load current. During this mode, Q7, Q11, and the anti-parallel diode of Q9 conduct. When the corresponding output average line-to-line voltage ($V_{BCo}$) meets its reference value $$\left(V_{BCO}^{reference}\right),$$

this mode ends, and the last discharging mode is initiated.

The last discharging mode discharges the link capacitor with the highest load current ($|I_{Ao}|$ in FIG. 4F(d)). During this mode, Q7, Q11, and Q12 are ON to supply the three-phase load. This mode lasts until the remaining energy of the link capacitor discharges to the load. The first charging mode (FIG. 4F(e)) starts after the first resonating mode. At the beginning of this mode, Q1 and Q5 start conducting under ZVS and the highest line-to-line voltage ($V_{AB}$) appears across the input inductor. As soon as the average value of the second-highest current ($I_B$) meets its reference value $$(I_B^{ref}),$$

Q5 turns off to initiate the second resonating mode.

In the second resonating mode, the input inductor and its parallel capacitor resonate and the voltage across the link input inductor changes from $V_{AB}$ to $V_{AC}$ gradually. At the end of this mode, Q6 turns on under ZVS to start the second inductor charging mode. And finally, during the second charging mode (FIG. 4F(f)) line-to-line voltage ($V_{AC}$) appears across the input inductor to charge it. This mode continues until the average of $I_C$ meets its reference value $$(I_C^{ref}).$$

At this point, the input switches turn off to initiate the last resonating mode. At the end of the last resonating mode, the input inductor voltage becomes equal to the absolute value of the link capacitor voltage to turn on the output-side anti-parallel diodes under ZVS for the next cycle.

FIG. 4F, in particular shows the non-isolated soft-switching three-phase AC-AC converter. FIG. 4K shows a similar non-isolated soft-switching AC-AC converter to FIG. 4F but more generally configured for a multi-phase source and multi-phase load, wherein n additional input switch pairs (e.g., Q1*n* and Q2*n* as shown) and m additional output switch pairs (e.g., S1*m* and s2*m*) are provided, wherein n and m correspond to a number of additional phases of the multi-phase source and load phases of the multiphase load.

FIG. 4J shows a similar non-isolated AC-AC multi-phase converter to FIG. 4K but employs hard switching instead of soft switching. Like FIG. 4K, n additional input switch pairs (e.g., Q1*n* and Q2*n* as shown) and m additional output switch pairs (e.g., S1*m* and s2*m*) are provided, wherein n and m correspond to a number of additional phases of the multi-phase source and load phases of the multiphase load.

Figure 8C:
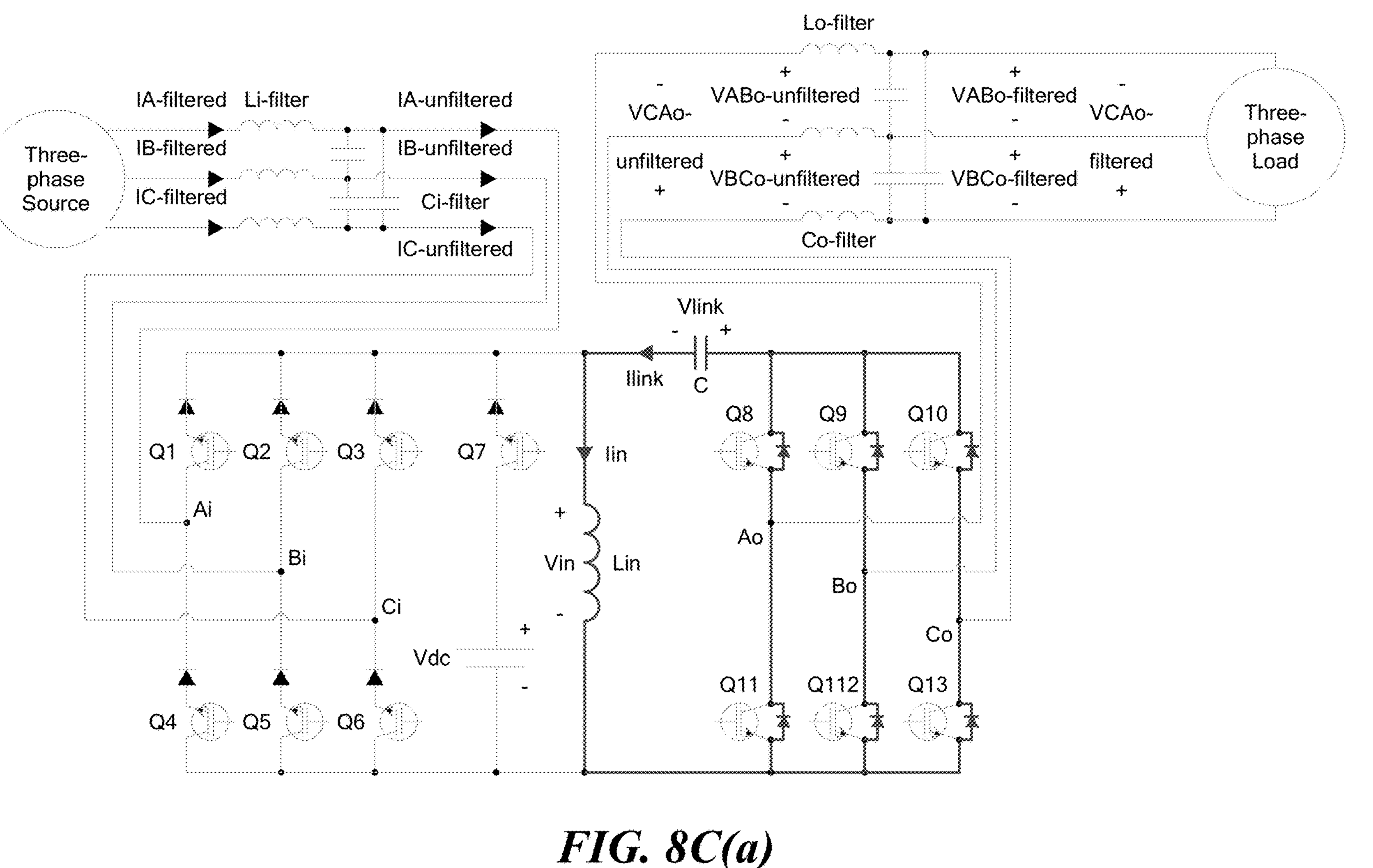
FIG. 8C is an illustration of the multi-port converter of FIGS. 8A and 8B during a first mode (a), a first discharging mode (b), a second discharging mode (c), a first charging mode (d), a second charging mode (e), a third charging mode (f) and resonating modes (g).
Figure 8C:
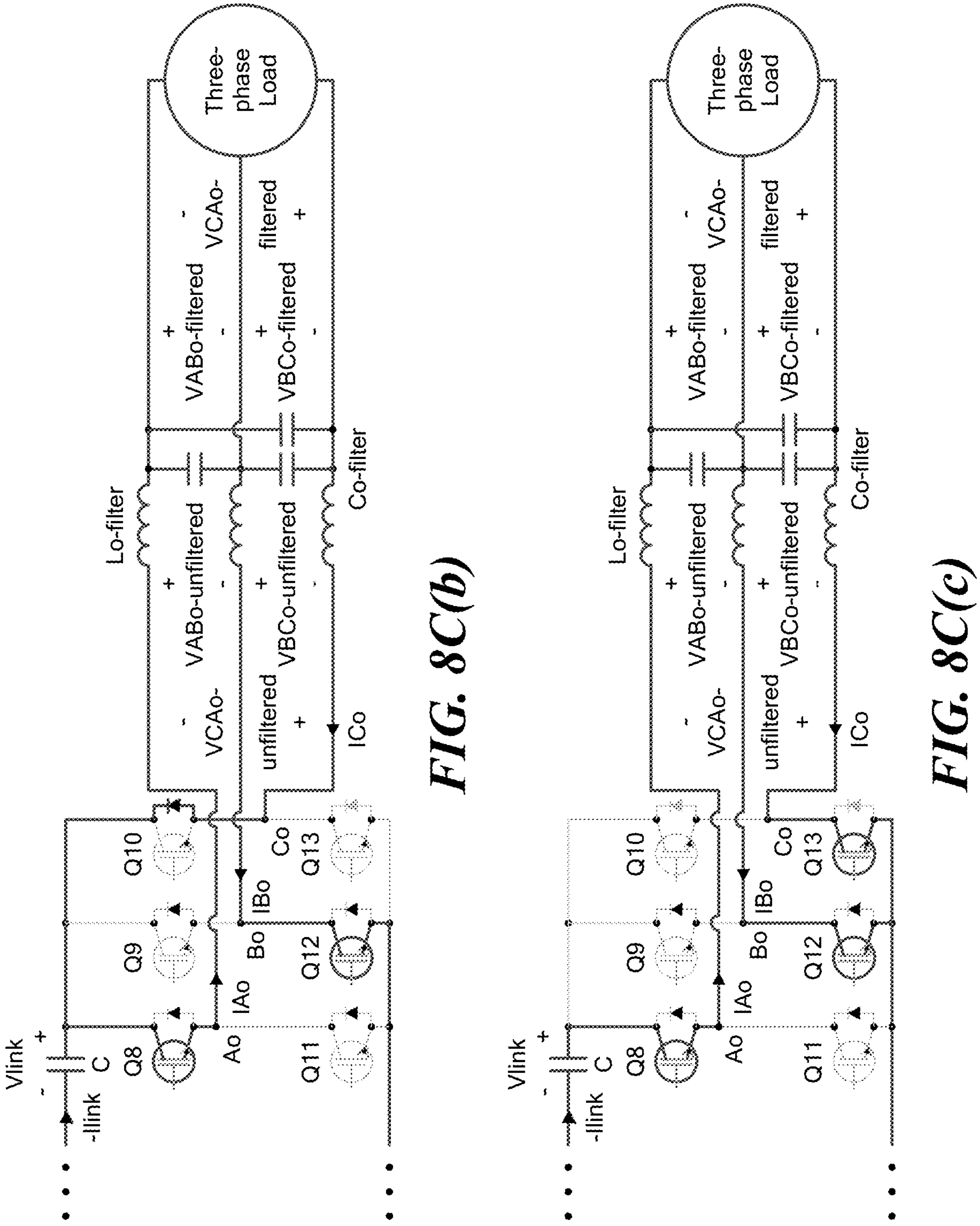
Figure 8C:
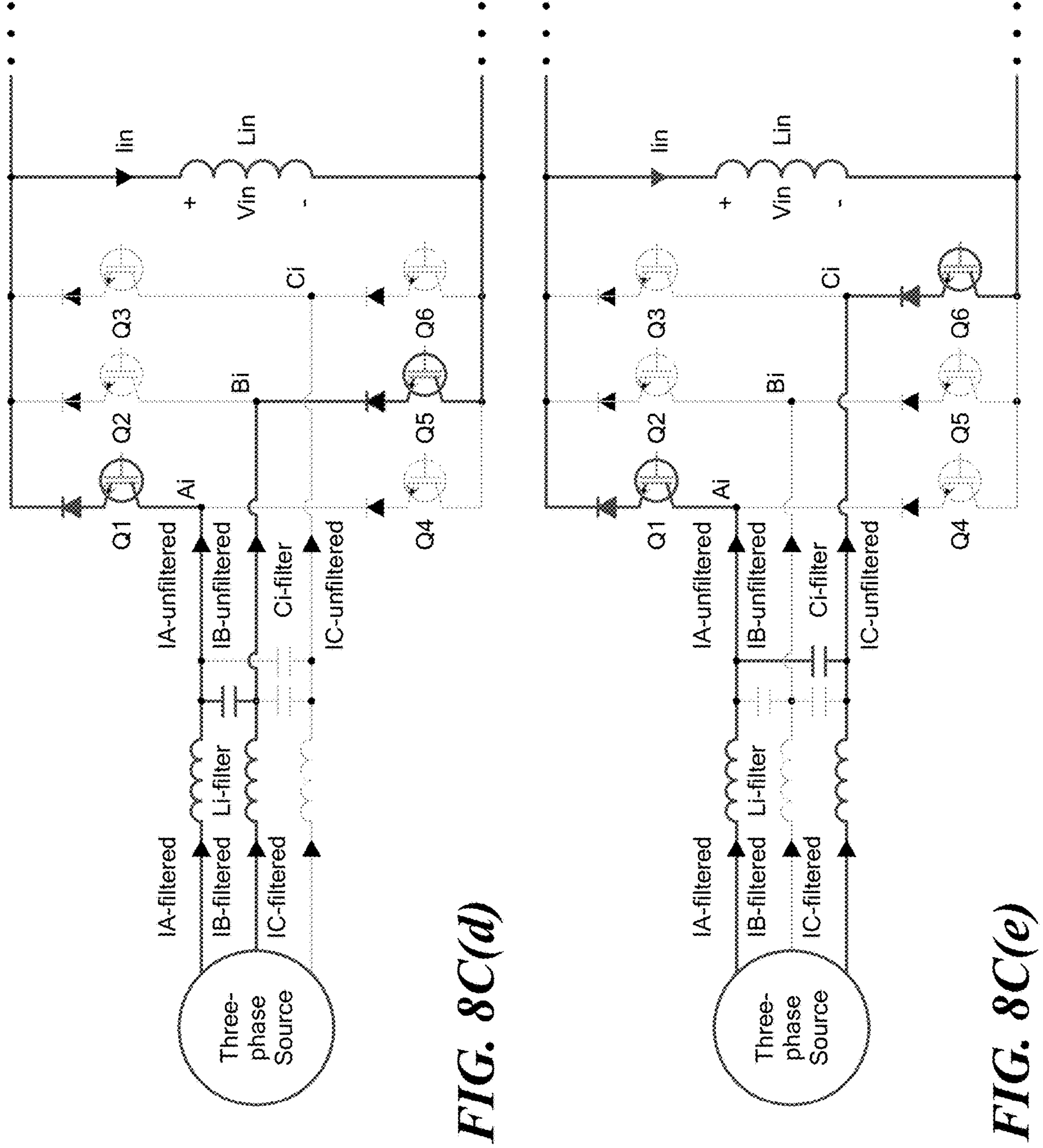
Figure 8C:
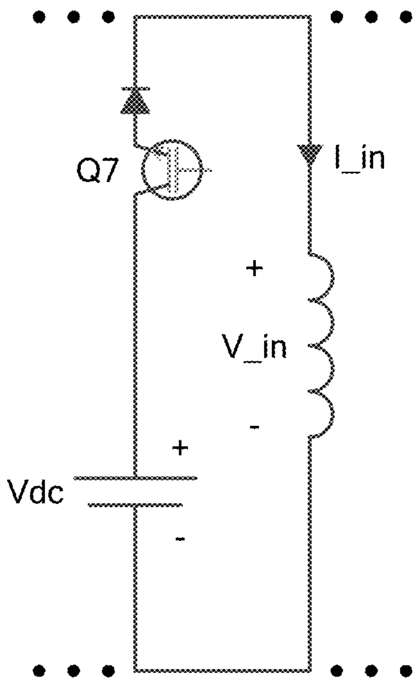
Figure 8C:
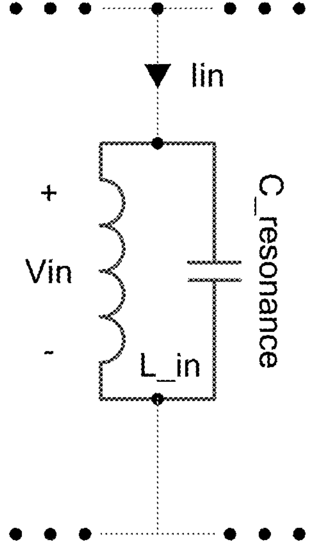

FIG. 8C shows a similar non-isolated hard-switching converter to FIG. 4J but configured instead for a multi-source, AC and DC input and an AC three-phase load, wherein the AC and DC input includes a three-phase source and a DC source (e.g., a battery) and wherein the DC source and an additional input switch (Q7) are added at the input stage of the converter.

FIG. 4G illustrates a) an isolated three-phase Zeta-based AC-AC converter having zero current switchings and b) the link voltage and link current produced with zero current switchings.

FIG. 4H(a) illustrates a first mode of a non-isolated three-phase Zeta-based AC-AC converter having zero current switchings in mode 1. As shown in FIG. 4H(a), in mode 1, all switches are in the off state, allowing the power to be transferred from the input inductor ($L_{in}$) to the link capacitor ($C_{link}$) through the output side antiparallel diodes. Once the link capacitor is fully charged, the appropriate switches are activated to finish this operating mode. After mode 1, the first resonating mode (FIG. 4H(d)) and the first input inductor charging mode (FIG. 4H(b)) start simultaneously.

During the first resonating mode, switches Q7 and Q11 are kept on establishing a resonating path for the link capacitor and its corresponding series inductor. As a result, the link current decreases gradually leading to turn of the antiparallel diode of Q12 off under ZCS (FIG. 4H(d)). This mode continues until the link current reaches a value equal to $-|I_{Bo}|$ (the second highest load current).

In the first capacitor discharging mode, the energy stored in the link capacitor is transferred to the three-phase load through the switches Q7, Q11, and the antiparallel diode of Q9 (FIG. 4H(e)). When $V_{BCo}^{average}$ meets its reference value, this mode ends, and another resonating mode (FIG. 4H(f)) starts along with another charging mode (FIG. 4H(c)).

During this resonating mode, both Q12 and the antiparallel diode of Q9 are conducting, creating a resonance between $L_{resonance}$ and $C_{link}$ to help turn the diode off under ZCS (FIG. 4H(f)). As a result, the link current gradually becomes more negative until it reaches $-|I_{Ao}|$ (The highest load current).

The last discharging mode is responsible for transferring the remaining energy stored in the link capacitor to the load with the load current $|I_{Ao}|$, which flows through switches Q7, Q11, and Q12 (FIG. 4H(g)). The link voltage can become negative during the discharging modes with no issue. As long as $V_{in}+V_{link}$ is positive, the antiparallel diodes of the output switches will not become undesirably forward biased. Once the link voltage reaches $-V_{AC}$, switch Q9 turns on to start the last resonating mode. In this mode $L_{resonance}$ and $C_{link}$ resonate until the link current becomes equal to the input inductor current ($I_{in}$) to help turn off Q1 and Q6 under ZCS (FIG. 4H(h)).

Referring now to FIG. 7, a flow-chart summarizing an embodiment of employing a Zeta converter to obtain and manage power from a power source for delivery to an electrical load in a managed manner is illustrated. With an AC power source as indicated at 710, a Zeta-based converter may route this power to an input stage having a plurality of input switches (a switching circuit) as indicated at 730. Notably, the input stage and its plurality of input switches can be operated to direct this power to a link stage for charging the link stage as indicated at 750 until an input phase of the AC power source reaches a reference current as indicated at 770. This current may itself be directed through an output stage of the Zeta converter, which can include a plurality of output switches (e.g., as shown in FIG. 4A) or a diode (e.g., as shown in FIG. 1B) operable to discharge the link stage to a load in one or more consecutive output modes as indicated at 790 to direct the current to an electrical load such that managed power is provided to the load.

Embodiments described hereinabove include techniques and a device in the form of a Zeta-based converter that may be considered universal as noted above. Further, the device may be employed as a rectifier, an inverter, an AC-AC converter, and/or a multiport converter. Notably, bulky and unreliable electrolytic capacitors may be avoided and replaced with smaller thin film capacitors. When utilized in combination with a high frequency transformer in place of a bulky in-line transformer, enhanced performance along with smaller and lighter weight assemblies may be provided.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Furthermore, the foregoing description should not be read as pertaining only to the precise structures described and shown in the accompanying drawings, but rather should be read as consistent with and as support for the following claims, which are to have their fullest and fairest scope.

As used herein, “consisting essentially of” allows the inclusion of materials or steps that do not materially affect the basic and novel characteristics of the claim. Any recitation herein of the term “comprising”, particularly in a description of components of a composition or in a description of elements of a device, can be exchanged with “consisting essentially of” or “consisting of”.

We claim:

1. A zeta-based power conversion device comprising:

an input stage coupled to an AC power source comprising a network having an input coupled to the AC power source and a switching circuit coupled to the input for management of power obtained from the AC power source, the switching circuit comprising a plurality of input switches, each of the plurality of input switches being a bidirectional-blocking forward-conducting switch;

an output stage comprising a plurality of output switches or a diode, coupled to an electrical load for controlling voltage to the electrical load, each of the plurality of output switches being a forward-blocking bidirectional-conducting switch;

wherein the device is operative in a continuous conduction mode or discontinuous conduction mode or in a boundary of continuous conduction mode and discontinuous conduction mode;

wherein each of the bidirectional-blocking forward-conducting switches comprises a single controllable switching device and a series diode, and the forward-blocking bidirectional conducting switch comprises a single controllable switching device and an anti-parallel diode;

wherein the device is operative to charge a link stage, coupled between the input stage and the output stage, from the AC power source in one or more consecutive input modes until, for each input mode except a last input mode, a current of an input phase of the power source reaches a reference current, and is operative to discharge the link stage to the load in one or more consecutive output modes, wherein for each output mode except a last output mode, a voltage across an output phase pair reaches a reference voltage, and, for the last output mode, the link stage discharges until a voltage across a link capacitor reaches a negative value of a minimum input voltage; and the output stage coupled to the switching circuit for distribution of voltage to the electrical load.

2. The power conversion device of claim 1, the link stage further comprising:

a link capacitor coupled to the input stage and having a frequency greater than the frequency of the power source; and a transformer coupled to the link capacitor for management of voltage from the input stage.

3. The power conversion device of claim 1 wherein the device is one of a rectifier, an AC-AC converter, and a multiport converter.

4. The power conversion device of claim 1 wherein switches of the switching circuit include bidirectional-blocking forward-conducting switches that are insulated-gate bipolar transistors with series diodes.

5. The power conversion device of claim 1 further comprising an inductor coupled to the plurality of switches and the link capacitor.

6. The power conversion device of claim 1 wherein the link capacitor is one of a thin film capacitor and a ceramic capacitor and switches of the network include bidirectional-blocking forward-conducting switches of metal-oxide-semiconductor field-effect transistors with series diodes.

7. The power conversion device of claim 6 wherein an energy storage capacity of the capacitor is substantially negligible.

8. The power conversion device of claim 2 wherein the transformer is a single-phase transformer with a frequency substantially that of a frequency of the switches.

9. The power conversion device of claim 8 wherein the zeta-based power conversion device is a multi-port converter and the load includes one of a battery and a motor.

10. A method of controlling power management from a power source through a zeta-based converter for use by an electrical load, the method comprising: providing an AC power source; receiving power from the AC power source at an input stage of a zeta-based power conversion device, the input stage comprising a network having an input coupled to the AC power source and a switching circuit coupled to the input for management of power obtained from the AC power source, the switching circuit comprising a plurality of input switches, each of the plurality of input switches being a bidirectional-blocking forward-conducting switch; operating the plurality of input switches in one or more consecutive input modes to charge a link stage of the zeta-based power conversion device, the link stage coupled between the input stage and an output stage of the zeta-based power conversion device; charging the link stage until an input phase of the AC power source reaches a reference current; and operating a plurality of output switches or a diode of the output stage to discharge the link stage to a load in one or more consecutive output modes, each of the plurality of output switches being a forward-blocking bidirectional-conducting switch; wherein the device is operative in a continuous conduction mode or discontinuous conduction mode or in a boundary of continuous conduction mode and discontinuous conduction mode; wherein each of the bidirectional-blocking forward-conducting switches comprises a single controllable switching device and a series diode, and the forward-blocking bidirectional conducting switch comprises a single controllable switching device and an anti-parallel diode, wherein: the step of charging further comprises charging the link stage from the AC power source in one or more consecutive input modes until, for each input mode except a last input mode, a current of the input phase of the power source reaches the reference current; and the step of operating the plurality of output switches or the diode of the output stage to discharge the link stage to the load in the one or more consecutive output modes further comprises wherein, for each output mode except a last output mode, a voltage across an output phase pair reaches a reference voltage, and, for the last output mode, the link stage discharges until a voltage across a link capacitor reaches a negative value of the minimum input voltage.

11. The method of claim 10 wherein the operating of the plurality of input switches comprises utilizing soft switching to manage the current as a rectifier.

12. The method of claim 10 wherein the operating of the plurality of input switches comprises utilizing soft switching to manage the current as an AC-AC converter.

13. The method of claim 10 wherein the operating of the plurality of input switches comprises three phases of alternating of the switches between off and on conditions.

* * * * *